United States Patent [19]

Hazen et al.

[11] Patent Number: 4,618,480
[45] Date of Patent: Oct. 21, 1986

[54] RECOVERY OF ALUMINA VALUES FROM ALUNITE ORE

[75] Inventors: Wayne W. Hazen, Denver; David L. Thompson; James E. Reynolds, both of Golden; Nicholas J. Lombardo, Boulder; Paul B. Queneau; John P. Hager, both of Golden, all of Colo.

[73] Assignee: Resource Technology Associates, Boulder, Colo.

[21] Appl. No.: 641,020
[22] Filed: Aug. 15, 1984
[51] Int. Cl.$^4$ .............................................. C01F 7/06
[52] U.S. Cl. ................................... 423/127; 423/120; 423/122; 423/183
[58] Field of Search ........................ 423/120, 122, 127

[56] References Cited

U.S. PATENT DOCUMENTS

| | | | |
|---|---|---|---|
| 3,134,639 | 5/1964 | Nylander | 23/63 |
| 3,890,425 | 6/1975 | Stevens et al. | 423/127 |
| 3,890,426 | 6/1975 | Stevens et al. | 423/127 |
| 3,983,211 | 9/1976 | Nasyrov et al. | 423/128 |
| 3,984,521 | 10/1976 | Nasyrov et al. | 423/120 |
| 3,996,334 | 12/1976 | Hartman et al. | 423/127 |
| 4,029,737 | 6/1977 | Stevens et al. | 423/127 |
| 4,057,611 | 11/1977 | Jennings et al. | 423/127 |
| 4,064,217 | 12/1977 | Hartman et al. | 423/120 |
| 4,230,678 | 10/1980 | Hartman et al. | 423/112 |
| 4,331,636 | 5/1982 | Svoronos | 423/126 |

FOREIGN PATENT DOCUMENTS 590158 12/1933 Fed. Rep. of Germany .
791021 9/1935 France .

OTHER PUBLICATIONS

Kinetics of Regeneration of Spent Seed from MHD Power Generation Systems, by J. I. Joubert, P. F. Mossbauer, T. C. Ruppel, D. Bienstock, U.S. Energy Research & Development Administration, Pittsburgh Energy Research Center, Energy Conversion, Pittsburgh, PA.

Engineering Design for the Westinghouse MHD Seed Regeneration Process, 7th International Conference on MHD Electrical Power Generation, vol. 1, pp. 351-355, by T. J. Lahoda and E. E. Lippert.

SCA-Billerud Recovery Process Goes On-Stream, by E. Horntvedt, Pulp and Paper International, Aug. 1968.

Study of Seed Reprocessing Systems for Coal Fired Open Cycle Coal Fired MHD Power Plants, Task I, Selection of Processes for More Detailed Study, DOE Contract No. DE-AC02-79ET 15613, Jul. 17, 1980.

G. Hohorst and H. L. Hou, Chem. Abstracts, 6828E (China).

Japanese Pat. No. 76-20, 438 (1973), Chem. Abstracts 86:191990F.

I. Gruncharov, Chem. Abstracts, 98-218029M (Bulgaria).

Comparative Characteristics of Sodium and Potassium Hydroaluminosilicates Formed Under Conditions of Silica Removal From Aluminate Solutions, by T. I. Avdeeva and A. A. Novolodskaya, Journal of Applied Chemistry of USSR (Engl. Trans.), vol. 39, No. 2, pp. 271-277, Feb. 1966.

Recovery of Sodium-Base Pulping Chemicals by Bicarbonation and Crystallization by Johna Gullichsen, Erik Saiha and E. Norman Westerberg, Tappi, Sep. 1968, vol. 51, No. 9, pp. 395-400.

Two-Stage Disilification of Pure Potassium Aluminate Solutions, at Atmospheric Pressure, by A. I. Lanier and Mai-Ki, Soviet Journal of Non-Ferrous Metals, vol. 37, No. 9, pp. 55-57, 1964 (Engl. trans.).

Primary Examiner—H. T. Carter
Attorney, Agent, or Firm—Sheridan, Ross & McIntosh

[57] ABSTRACT

A novel process for the recovery of alumina and potassium sulfate from alunite is provided comprising leaching the alunite with potassium hydroxide to which no sodium materials have been added, said leach solution being saturated with potassium sulfate. Aluminum values are solubilized into the leachate, and potassium and sulfur values are rendered soluble, but remain in the residue. The leachate is desilicated if necessary, preferably with lime, and aluminum trihydroxide is precipitated therefrom, followed by calcining to alumina product. The residue is leached to solubilize potassium sulfate in a secondary leach and the potassium sulfate product crystallized therefrom. Potassium hydroxide is regenerated from a portion of the potassium sulfate secondary leachate by several methods.

Novel procedures for regenerating alkali metal hydroxides from the corresponding sulfates are also provided including routes involving formates and carbonates as intermediates and pyrohydrolysis.

37 Claims, 4 Drawing Figures

PHASE STABILITY DIAGRAM

K-O-H-C-S SYSTEM

TEMPERATURE = 700 DEG. C

ALUMINUM EXTRACTION vs TIME

RECOVERY OF ALUMINA VALUES FROM ALUNITE ORE

TECHNICAL FIELD

This invention is in the field of hydrometallurgy, and particularly relates to a process for the selective recovery of aluminum, potassium and sulfur values from alunite ore using a potassium hydroxide leach and to methods of producing alkali hydroxides, such as potassium hydroxide from alkali sulfates.

BACKGROUND OF THE INVENTION

Alunite is a potassium aluminum sulfate mineral having the general formula: $KAl_3(OH)_6(SO_4)_2$. Alunite ores, also typically contain varying amounts of sodium-containing minerals and/or silica, $SiO_2$. Several processes have been developed for recovering aluminum values from alunite ore, many of which also include recovery of the potassium values as $K_2SO_4$. All have been plagued by some major economic flaw; for example, expensive purchased reagents, complicated and capital-intensive processes, requirements for sulfuric acid production to handle sulfur dioxide off-gas, effluent pollution problems, and/or high energy requirements for thermal pretreatment of the ore.

Alunite is not very soluble in water and, as such, many mineral recovery processes involve caustic leaching of the ore to solubilize the potassium and aluminum values into the leach liquor from which they are subsequently separated and recovered. U.S. Pat. Nos. 3,983,211; 3,890,425; 3,890,426; 4,029,737; 4,064,217 and 4,057,611 exemplify prior art teachings with respect to caustic leaching with $NH_4OH$ or $NaOH$, $KOH$ and mixtures thereof. Many prior art processes such as those of U.S. Pat. Nos. 3,890,425; 3,890,426; 4,029,737 and 4,057,611 require roasting or dehydrating the alunite prior to leaching. In each of these prior art processes, the potassium values of the alunite ore are extracted in the initial leaching consistent with what has heretofore been considered the only effective method of mineral value recovery. In such methods, the alumina-containing residue is treated in a typical Bayer-type circuit for recovery of high grade alumina, i.e. leached into solution typically a caustic solution of $NaOH$ and a mixture of $NaOH$ and $KOH$, and reprecipitated.

It is known that where significant amounts of silica are present in the ore, losses of aluminum values by precipitation of insoluble alkali aluminosilicates can occur. U.S. Pat. Nos. 3,983,211 and 3,984,521 teach leaching processes wherein production of aluminosilicates is minimized. In both patents, a mixture of $KOH$ and $NaOH$ is used as the initial leach. In addition, U.S. Pat. No. 3,984,521 teaches that the initial leach must be carried out at a temperature below 60° C. with the disadvantage of slow kinetics. U.S. Pat. No. 3,983,211 permits a higher temperature leach but requires a substantial excess of sodium ions relative to potassium ions. In U.S. Pat. No. 3,983,211 the aluminum and potassium ore values are both extracted into the initial leach liquor. U.S. Pat. No. 3,984,521 teaches solubilizing the aluminum values in the relatively low temperature leach while leaving potassium and sodium sulfates and silicates in the leach residue, but because of the substantial amount of sodium present requires a separation between the sodium and potassium sulfates which are subsequently extracted together from the residue.

French Pat. No. 791,021 teaches a process for leaching alunite with a $KOH$ leach and solubilizing the aluminum, potassium, and sulfur values from the ore into the leachate. Potassium, sulfur and silicate values are crystallized from the leachate by cooling, with subsequent processing of the leachate to recover aluminum values. The process of French Pat. No. 791,021 is directed primarily toward production of pure alumina and does not teach any overall system demonstrating recovery of pure $K_2SO_4$ or regeneration of $KOH$ by any of the methods utilized herein.

Other references to potassium hydroxide leaching of alunite include G. Hohorst et al., J. Kim Enge. (China), 4, 21–8 (1937); Chemical Abstracts-6828E; Japanese Pat. No. 76-20, 438 (1973); Chemical Abstracts, 86, 191990F, and I. Gruncharov, Chemical Abstracts 98-218029M (Bulgarian).

None of this prior art discloses or suggests the separation of aluminum values into a primary leach liquor by using a potassium hydroxide leach saturated with $K_2SO_4$ and thereby leaving the potassium and sulfur values in the primary leach residue.

J. Gullichsen et al., "Recovery of Sodium-Base Pulping Chemicals by Bicarbonation and Crystallization," Tappi, Vol. 51, No. 9, 395–400 (Sept. 1968) and U.S. Pat. No. 3,134,639 disclose sulfidization and carbonization reactions for converting alkali metal sulfates to carbonates, but this art does not show subsequent conversion to the hydroxide nor recycle of the hydroxide solution to a leach process for alunite. Similarly, German Pat. No. 590158 (1933) shows conversion of potassium sulfate to potassium formate with subsequent conversion to potassium carbonate, but this art does not show or suggest subsequent conversion to the hydroxide, nor recycle of the hydroxide to an alunite leach process.

The pyrohydrolysis of sodium sulfate to sodium carbonate in a green processing with coal and water has been described in E. Horntvedt, "SCA-Billerud Recovery Process Goes On-Stream," Pulp and Paper International, August, 1968. Pyrolysis of potassium sulfate with coal or reducing gases has also been described in E. J. Lahoda et al., "Engineering Design for the Westinghouse MHD Seed Regeneration Process," 7th International Conference on MHD Electrical Power Generation, Vol. 1, Page 351; J. I. Joubert et al., "Kinetics of Regeneration of Spent Seed from MHD Power Generation Systems," U.S. Energy Research and Development Administration, Pittsburgh Energy Research Center, Energy Conversion, Pittsburgh, Pennsylvania; and "Study of Seed Reprocessing Systems for Coal Fired Open Cycle Coal Fired MHD Power Plants, Task I, Selection of Processes for More Detailed Study," D.O.E. Contract No. DE-AC 02-79ET 15613, July 17, 1980. These authors all require a two-stage reaction in which potassium sulfate is converted to potassium sulfide at high temperature, followed by low temperature oxidation of the potassium sulfide to potassium carbonate, and none teaches or suggests the parameters or viability of a process for the direct, one-stage pyrolysis conversion of an alkali metal sulfate to the corresponding carbonate. In addition, none teach or suggest further conversion of the carbonate to the hydroxide.

None of the above-described art shows or suggests the desirability of using alkali metal and sulfur values contained in an ore to generate a caustic leach solution for that ore.

SUMMARY OF THE INVENTION

This invention provides novel processes for recovering aluminum, sulfur and potassium values from alunite ore by contacting alunite ore in a primary leach with an aqueous potassium hydroxide solution which is saturated with potassium sulfate and to which no sodium has been added in the form of sodium hydroxide or otherwise. By this potassium hydroxide leach the aluminum values are selectively removed into the leach solution while rendering the potassium and sulfate values in the ore water soluble but nevertheless left in the residue of the primary leach. After separation of the primary leachate from the residue, the leachate is optionally desilicated and then treated to precipitate aluminum trihydrate from the leach solution. The aluminum trihydrate is calcined to produce an alumina product. The potassium values are recovered from the residue for ultimate production of potassium sulfate and, in a preferred embodiment for regeneration of the KOH needed for the primary leach.

The potassium sulfate-containing solid residue from the primary leach is leached in a secondary leach with an aqueous solution, preferably water and/or recycle solution, i.e. mother liquor returning from the potassium sulfate crystallizer circuit, to solubilize the potassium sulfate in the alunite residue. After separation of the leachate containing the solubilized potassium sulfate from the solid residue, the potassium sulfate is recovered by crystallization.

Several embodiments of the present invention utilize different hydroxide generation schemes wherein the potassium sulfate ($K_2SO_4$) produced during processing is in part used to regenerate the potassium hydroxide (KOH) for recycle to the initial leaching step. In one instance, a novel method of converting $K_2SO_4$ to KOH by pyrohydrolysis is provided which can be used with or without the alunite leaching processes of the present invention. In another instance, a novel process of producing KOH from $K_2SO_4$ through use of a formate intermediary is disclosed which can also be used other than in conjunction with the alunite leaching processes of the present invention.

The first of these combined leaching leach regeneration processes involves the use of the Al and K value recovery process of the present invention coupled with use of the known Nylander process (U.S. Pat. No. 3,134,639) for the conversion of alkali metal sulfates to their corresponding carbonates. Formation of carbonates is followed by causticization of the formed carbonates with lime to generate: (1) hydroxides for recycle to the primary leach; (2) calcium carbonate which is decomposed to carbon dioxide for recycle to the Nylander reactions and lime for recycle to the causticization step. This method has the unexpected advantage of a balanced series of process steps wherein by a unique series of recycle streams, Al, S, and K values are recovered in a total process wherein the only consumed reagent, if desired, can be CaO. Optionally, this CaO can be produced, e.g. in a kiln, from $CaCO_3$ which would then be the only chemical reagent purchased.

A different embodiment couples the novel alunite leaching process of the present invention with a hydroxide generation step comprising digestion under pressure of the corresponding potassium sulfates with lime and carbon monoxide to form the alkali metal formates and gypsum. The gypsum is removed and the clear liquor containing the alkali metal formate is evaporated and the crystals calcined to oxidize the formate to the corresponding carbonate. The carbonate is then causticized as described above, preferably followed by decomposition of the formed carbonate to lime for recycle to causticization.

Alternatively, in a novel improvement on processes incorporating the formate regeneration procedure, the conversion from the sulfates to the hydroxides is a direct hydrometallurgical one. The potassium sulfate is digested under pressure with excess lime and carbon monoxide, followed by the addition of an oxidizing agent to the reaction vessel to form carbonate and then potassium hydroxide. This conversion process is an advantageous improvement over the known "formate"-route conversion of alkali metal sulfates to their hydroxides, independent of its use in conjunction with the alunite value recovery processes of the present invention. Calcium carbonate by-products may be decomposed to form lime for recycle to the process.

In a separate embodiment, the subject alunite processing is coupled with KOH regeneration by pyrohydrolysis. A novel one stage potassium hydroxide generation by pyrohydrolysis has been disovered wherein sulfates are converted to the corresponding carbonates by reacting the sulfates with a reducing agent at elevated temperatures for a time sufficient to produce solid carbonates which may advantageously be used independent of whether the alkali metal sulfate emanates from the alunite processing of the present invention. When incorporated with the novel alunite leaching processes described herein, the carbonates are then causticized as above described, preferably with decomposition of the formed calcium carbonate to lime and carbon dioxide and recycle of the lime to causticization. This procedure has the advantage of producing hydrogen sulfide from which by-product sulfur can be recovered.

A further alkali metal hydroxide generation process useful in conjunction with the alunite leaching process of the present invention involves reacting the sulfates with barium oxide (or hydroxide) to form the potassium hydroxides directly, along with barium sulfate. This barium sulfate may then be used to regenerate barium hydroxide by reducing with coal, e.g. in a black ash rotary furnace, to barium sulfide, then reacting with carbon dioxide to form barium carbonate and hydrogen sulfide, followed by reduction, using coal or coke as a reductant, of the barium carbonate to barium oxide for recycle to the alkali-metal-hydroxide-forming reaction.

In preferred embodiments of this invention, the levels of impurities in the alunite processing steps are controlled by treating bleed streams from the leaching solutions. The treated products may then be returned to the leach circuits.

As will be known and understood by those skilled in the art, the processes described above for converting potassium sulfates to potassium hydroxide for recycle to the KOH leach step may be modified and incorporated for use in any caustic leaching process for ores containing alkali metal and sulfur values in which alkali metal sulfate-containing streams may be generated to the required caustic. Examples of such process are those of U.S. Pat. Nos. 3,984,521; 3,983,211; 4,230,678; 3,890,425; 3,890,426; 4,064,217; and 4,029,737 incorporated herein by reference. As such, other embodiments of this invention comprise novel processes which are improvements over known processes for caustic leaching of ore in that they incorporate a particular leach regeneration scheme and thereby result in novel and advantageous methods for metal value recovery.

DETAILED DESCRITPION OF THE PREFERRED EMBODIMENTS

Figure 1:
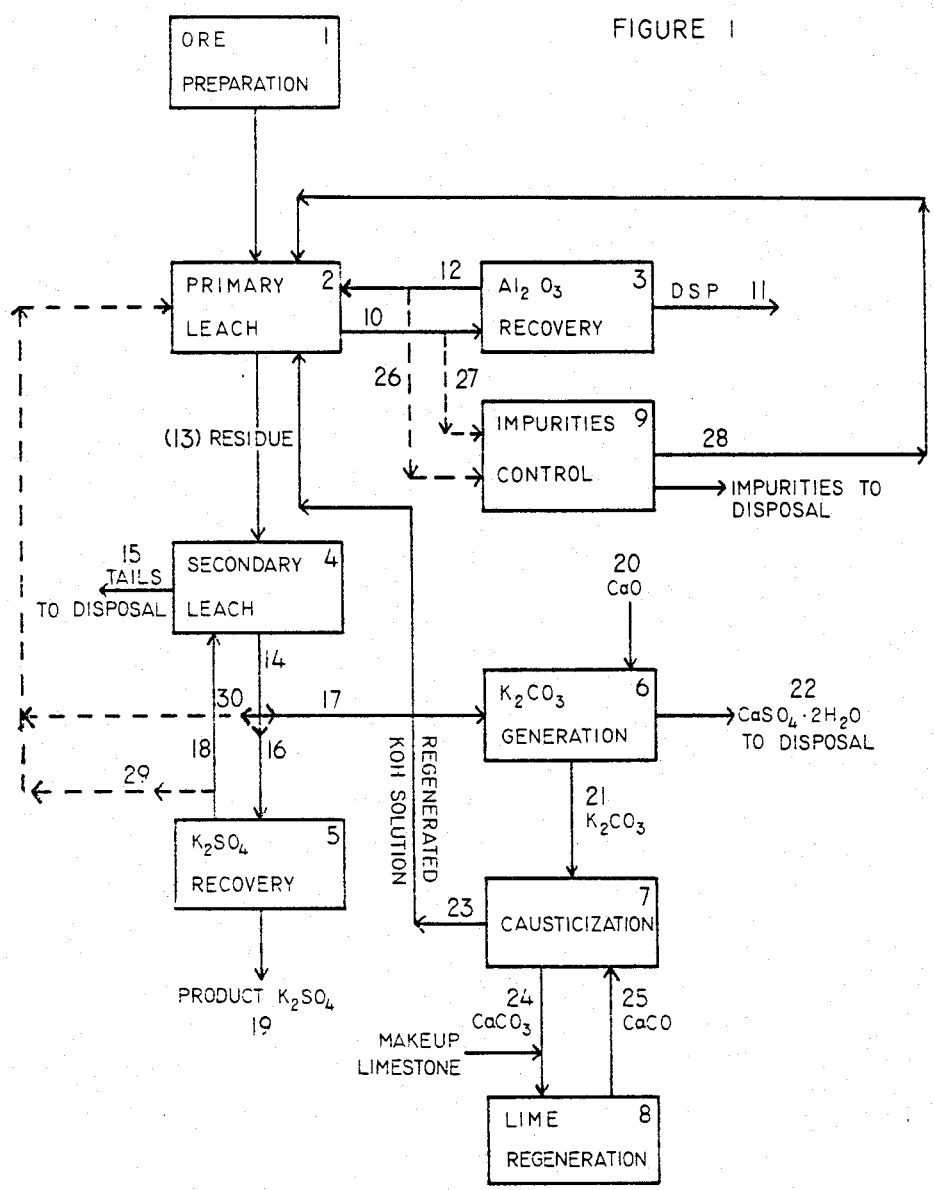
FIG. 1 is a general diagrammatic representation of one embodiment of the present invention.

1 Recovery of alumina and potassium sulfate from alunite.

Alunite feed ores useful in the practice of the present invention typically contain various amounts of silica and other minerals. According to the present invention there is provided a process for the recovery of aluminum, potassium and sulfur as alumina and potassium sulfate from alunite. The process involves leaching raw, i.e. thermally untreated, alunite ore with a potassium hydroxide solution saturated with potassium sulfate whereby aluminum is solubilized into the potassium hydroxide and potassium sulfate-containing first leachate, leaving the potassium and sulfur values of the ore in the residue, but rendering them water soluble. Although thermal treatment or roasting is unnecessary for practice of the invention, as will be understood, roasted ore could similarly be treated. The primary leach of the present invention utilizes a strong potassium hydroxide leach liquor which is saturated with $K_2SO_4$, simultaneously with or preferably prior to contacting with the ore for primary leaching, and to which no sodium has been added as NaOH or otherwise. To the extent any sodium is present, it will be that which was initially present in the ore. Sodium build-up is controlled through impurities bleed streams described herein below and in all instances will be maintained below a level of 70%.

The alunite ore is typically ground and/or crushed to make it more amenable to leaching. The primary leach must be conducted under temperature conditions that are not too hot, and for a time that is not too long, otherwise severe silica problems will result; i.e., the aluminum values may precipitate out of the leach solution as aluminosilicates and/or undesirably high levels of silica will be extracted into the liquor. The primary leach will typically be at a temperature above 60° C., at least above 70° C., preferably, the primary leach temperature is between about 70° C. and about 150° C., and more preferably between about 90° C. and about 100° C., and the retention is between about 1 minute and about 120 minutes, and more preferably between about 20 minutes and about 40 minutes. Potassium hydroxide concentration of the starting leach solution is between about 180 g/l and about 280 g/l, preferably between about 225 g/l and about 245 ; g/l and no sodium is present. By selection of proper primary leach conditions the following results are obtained: (a) maximizing of the solubilization of the ore's aluminum values into the leachate; (b) rendering most of the ore's potassium values water soluble; (c) minimizing solubilizing of the ore's potassium values into the leach solution; and (d) minimizing precipitation of the aluminum values as aluminosilicates.

Aluminum trihydroxide is precipitated from the first leachate, preferably after it has been desilicated, as silica is an unacceptable contaminant in alumina for most purposes, e.g. electrolytic reduction. Desilication methods known to the art may be used; and in a preferred embodiment of this invention involving conducting the process so as to use lime as the only makeup reagent, desilication is accomplished by adding lime to the leachate to precipitate the solubilized silica as calcium aluminosilicate. In the context of this invention, "lime," "CaO" and "$Ca(OH)_2$" are used interchangeably, it being understood that CaO or $Ca(OH)_2$ may be added to the system either dry or as a $Ca(OH)_2$ slurry. Desilication, when using lime, is accomplished by heating the aluminum-laden leachate to an elevated temperature above about 100° C., preferably from about 180° C. to about 200° C. To this heated leachate is added lime. After a retention time sufficient to precipitate the aluminum values present, preferably between about 5 and about 30 minutes, the precipitated desilication product (DSP) is separated from the leachate. While some desilication will occur at temperatures below 180° C., typically more vigorous temperature conditions are necessary in a potassium system than in a sodium system. Thus, the preferred temperature range of about 180° C. to about 200° C. represents an optimizing of temperature conditions. Also, with longer retention time more desilication will typically be accomplished, but with concomitant higher aluminum precipitation loss. The amount of lime is typically not critical, except to the extent that insufficient lime will result in insufficient seed for desilication. Thus, the lime added to the aluminum-laden leachate is preferably in the range of about 12 to about 20 grams per liter of leachate, based on a silica content in the leachate of about 1.5 g/l $SiO_2$. The lime is preferably added as an aqueous calcium hydroxide slurry to maximize reactivity.

Following desilication, a high grade aluminum trihydroxide is precipitated from the primary leachate and at least some of the remaining liquor is advantageously returned to the primary leach. The aluminum trihydroxide may then be calcined to form the alumina product.

Potassium and aluminum values present in the ore which have been rendered water soluble by the primary leach remain in the residue due to the saturation of the leach liquor with potassium sulfate and selection of other primary leach conditions according to the present invention. The solid residue, after separation from the primary leachate is slurried with an aqueous solution, preferably water which may contain at least some of the spent liquor from potassium sulfate crystallization described below, to solubilize potassium and sulfur values present in the residue into the secondary leach liquor as potassium sulfate. After separating the tailings from the potassium sulfate-containing leachate, at least a portion of this secondary leachate is treated by means known to the art to produce potassium sulfate product, preferably by crystallization. The remaining portion of the secondary leachate may be treated to generate potassium hydroxide in accordance with one or more of the caustic generation processes described below. The potassium hydroxide is then recycled to the primary alunite leach.

Bleed streams for controlling the level of impurities including any sodium present from the ore and the buildup of excessive potassium hydroxide in the secondary leach circuit are provided according to the processes of this invention. Separate bleed streams may be taken from alternative points along both the primary leach circuit and the secondary leach circuit. The bleed streams can be treated by a variety of known methods to remove impurities. In a preferred method, the bleed stream from the secondary leach circuit is returned to the primary leach circuit without treatment. In another preferred embodiment, the bleed stream from the primary circuit is reacted in a carbonation reactor to precipitate aluminum and potassium hydroxide. Excessive potassium hydroxide in the primary leach causes a deterioration of the conditions for desilication from the alumina-containing primary leachate. Furthermore, excessive potassium hydroxide in the secondary leach solution can cause a decrease in the solubility of sulfate, hence, less productivity in the potassium sulfate crystallization circuit.

2. Hydrogen sulfide-lime caustic generation.

The following described caustic generation process is applicable not only in the above-described process for the recovery of alumina and potassium sulfate from alunite, but to any process where it is desirable to leach an ore with one or more alkali metal hydroxides for the recovery of metal values therefrom, which ore contains alkali metal and sulfur values.

The conversion of alkali metal sulfates to alkali metal carbonates is conducted generally according to the process taught in U.S. Pat. No. 3,134,639. Hot saturated alkali metal sulfate solution is reacted with lime slurry and hydrogen sulfide gas, e.g. in a spray tower, to form gypsum as a precipitate and soluble alkali metal sulfides. These alkali metal sulfides include alkali metal hydrosulfides. A liquid/solid separation is performed and the gypsum tailings are sent to disposal. The alkali metal sulfide-containing liquor is next treated with carbon dioxide, preferably in an absorption tower, to form alkali metal bicarbonates and carbonates and hydrogen sulfide. The hydrogen sulfide is preferably recycled to treat additional alkali metal sulfates. The bicarbonate/carbonate solution is then contacted with water at high temperature, preferably by steam stripping, whereupon carbon dioxide is removed. This carbon dioxide is preferably recycled to treat the alkali metal sulfides as described above. Approximately half the required carbon dioxide is generated by this method. During the treatment of the bicarbonate/carbonate solution to release carbon dioxide, the bicarbonates are converted to carbonates. The alkali metal carbonate solution is then causticized to generate alkali metal hydroxide therefrom, preferably by reacting with lime at about 85° C. to about 95° C. The resultant solution desirably contains about 12% alkali metal hydroxide. During treatment with lime, calcium carbonate is precipitated. A liquid/solid separation is performed and the calcium carbonate is advantageously heat treated in the presence of water to generate lime for recycle to the first step of the conversion process and/or the causticization process, and carbon dioxide for recycle to the treatment of the alkali-metal-sulfide-containing liquor. The alkali metal hydroxide solution is advantageously recycled to the primary ore leaching step, after evaporation, if necessary, to achieve the desired concentration. It has been discovered that utilization of this regeneration process in conjunction with the novel KOH alunite leaching methods of the present invention advantageously results in a novel overall process wherein inexpensive CaO is the sole consumptive reagent.

3. Formate caustic generation.

The following described caustic generation processes involving intermediate alkali metal formate and carbonate production are applicable to any process where it is desirable to leach an ore with alkali metal hydroxides for the recovery of metal values therefrom, which ore contains alkali metal and sulfur values.

In one embodiment of the formate route for alkali metal hydroxide regeneration, alkali metal sulfates are contacted with hydrated lime, Ca(OH)$_2$ at elevated temperatures and pressures in the presence of carbon monoxide gas for a time sufficient to convert the sulfates to the corresponding formates, according to the following reaction:

$$M_2SO_4 + Ca(OH)_2 + 2CO \rightarrow 2MCOOH + CaSO_4. \qquad (1)$$

(M = alkali metal)

Temperatures suitable for the conversion reaction will typically be from about 180° C. to about 260° C.; preferably from about 210° C. to about 230° C. Pressures will typically be in the range of from about 400 psi to about 700 psi.

After the formation of the potassium formate and gypsum, the gypsum, CaSO$_4$, is separated from the liquor, and is typically acceptable for disposal without further treatment.

The alkali metal formates are crystallized from the liquor remaining after the gypsum separation, by any conventional method, preferably evaporation. The formate crystals are then calcined at a temperature of from about 350° C. to about 450° C., preferably about 400° C. and for a time sufficient to produce the corresponding alkali metal carbonates. The reaction is as follows:

$$2MCOOH + O_2 \rightarrow M_2CO_3 + CO_2 + H_2O. \qquad (2)$$

The resulting alkali metal carbonates are sent to causticization with lime in an aqueous solution where the corresponding alkali metal hydroxides and solid calcium carbonate are formed. The hydroxide solution is separated from the precipitated calcium carbonate, with the calcium carbonate precipitate advantageously sent to lime regeneration and the hydroxide solution advantageously recycled to the primary ore leaching step, after evaporation, if necessary to achieve the desired concentration.

In a novel and advantageous process, alkali metal sulfates may be converted to alkali metal hydroxides by a direct hydrometallurgical route. This direct hydrometallurgical route may be utilized in any process wherein it is desirable to convert alkali metal sulfates to the corresponding hydroxides.

In the process according to this invention, the alkali metal sulfate-containing leachate is contacted with lime in an aqueous solution at elevated temperature and pressure in the presence of carbon monoxide gas and for a time sufficient to produce the alkali metal formate. The formate thus formed is oxidized to alkali metal carbonate with an oxidizing agent, preferably an oxidizing gas such as O$_2$ or air. Upon conversion, the carbonate is immediately reacted with lime to produce the alkali metal hydroxide. Advantageously and preferably, the lime is already present in the system as excess hydrated lime over that amount consumed during the formation of the formates. In another embodiment, the excess lime may be added to the system during both or either the carbon monoxide and/or oxidizing phases of the process.

The reaction steps may be represented as follows:

$$M_2SO_4 + 2CO + Ca(OH)_2 \rightarrow 2MCOOH + CaSO_4 \quad (3)$$

$$2MCOOH + O_2 \rightarrow M_2CO_3 + H_2O + CO_2 \uparrow \quad (4)$$

$$M_2CO_3 + Ca(OH)_2 \rightarrow 2MOH + CaCO_3. \quad (5)$$

Thus, the net reaction may be exemplified as follows:

$$M_2SO_4 + O_2 + 2CO + 2Ca(OH)_2 \rightarrow 2MOH + CaSO_4 + CaCO_3 + CO_2 + H_2O. \quad (6)$$

The reaction for converting alkali metal sulfates to alkali metal hydroxides may be conducted within the temperature range of about 180° C. to about 280° C.; preferably about 200° C. to about 240° C. The pressure for the reaction is typically from about 200 psi to about 1500 psi; preferably from about 300 psi to about 600 psi. The carbon monoxide is added to the system, during the formate production, preferably by sparging. The reaction time for formate production under the carbon monoxide atmosphere is typically from about 2 to about 60 minutes. The oxidizing agent is preferably an oxidizing gas. The reaction time under the oxidizing atmosphere is typically from about 2 to about 60 minutes.

In preferred embodiments, the formate caustic regeneration methods are used in conjunction with the novel KOH alunite leaching of the present to advantageously generate the potassium hydroxide from potassium sulfate for recycle to a primary alunite leach, as described above. The potassium sulfate contained in the secondary leachate is reacted with hydrated lime at elevated temperatures and pressures under a carbon monoxide atmosphere to produce potassium formate. Next, potassium carbonate is formed, but in the presence of an oxidizing agent. The thus-formed potassium carbonate is converted to potassium hydroxide by the contact of the potassium carbonate with hydrated lime. The potassium hydroxide-containing solution is separated from the precipitated calcium sulfate and calcium carbonate, typically by filtration. The potassium hydroxide solution is recycled for use in the ore leaching. In the alunite processes which include regeneration of CaCO_3, calcium sulfate in the secondary leachate is advantageously separated, e.g. by solid/liquid separation prior to either K_2CO_3 or CaCO_3 formation.

4. Pyrohydrolysis caustic regeneration.

The novel pyrohydrolysis conversion of alkali metal sulfates to hydroxides is useful not only in connection with the above-described alunite process, but in connection with any process in which it is desired to convert alkali metal sulfates to alkali metal carbonates and/or hydroxides, including processes for leaching of ore materials with alkali metal hydroxides, in which the ore materials contain alkali metal and sulfur values which may be recovered during processing of the ore as alkali metal sulfates and converted to the corresponding hydroxides for recycle to the ore leach.

In the process of this invention an alkali metal sulfate is reacted with coal and/or a reducing gas to produce the corresponding carbonate according to the following reactions:

$$M_2SO_4 + 2C + H_2O \rightarrow M_2CO_3 + H_2S + CO_2; \text{ or} \quad (7)$$

$$M_2SO_4 + CO + H_2 \rightarrow M_2CO_3 + H_2S + CO_2 \quad (8)$$

$$K_2SO_4 + CH_4 \rightarrow K_2CO_3 + H_2S + H_2O. \quad (9)$$

The carbonates are then causticized with lime as described above to form the corresponding hydroxides. The formed carbon dioxide may be recycled to the reactor if desired. The above reaction may be conducted in one stage in a furnace or fluid bed reactor, as described in the examples hereof.

When coal is used as the reducing agent, a stoichiometric ratio of carbon to alkali metal sulfate of between about 1 and about 3, preferably between about 1.1 and about 1.3 is desirable.

Figure 2:
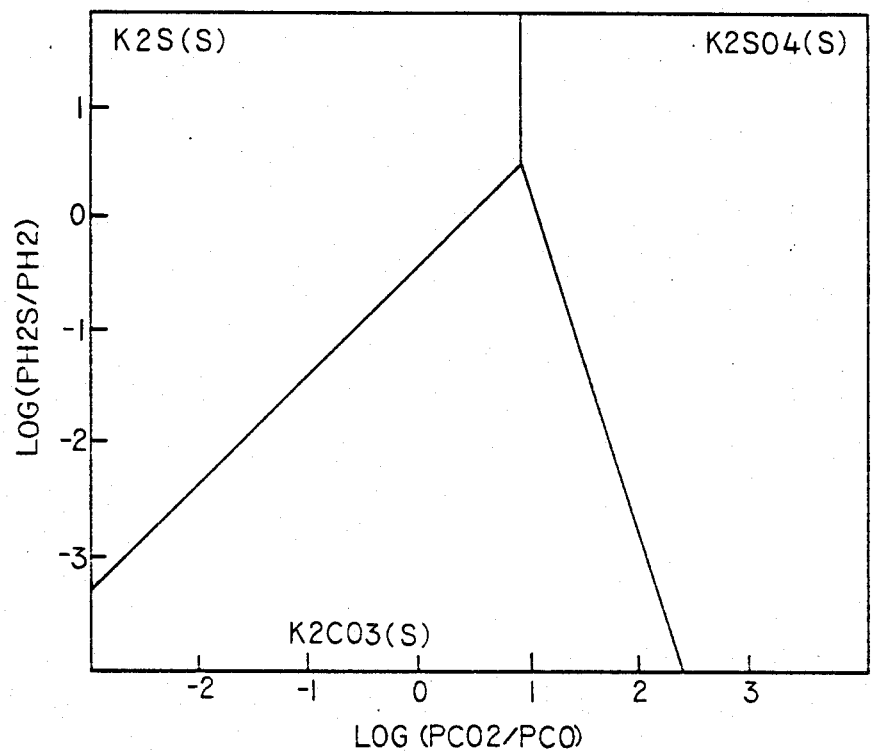
FIG. 2 is a phase stability diagram relating to the conversion of potassium sulfate to potassium carbonate by pyrohydrolysis.
Figure 3:
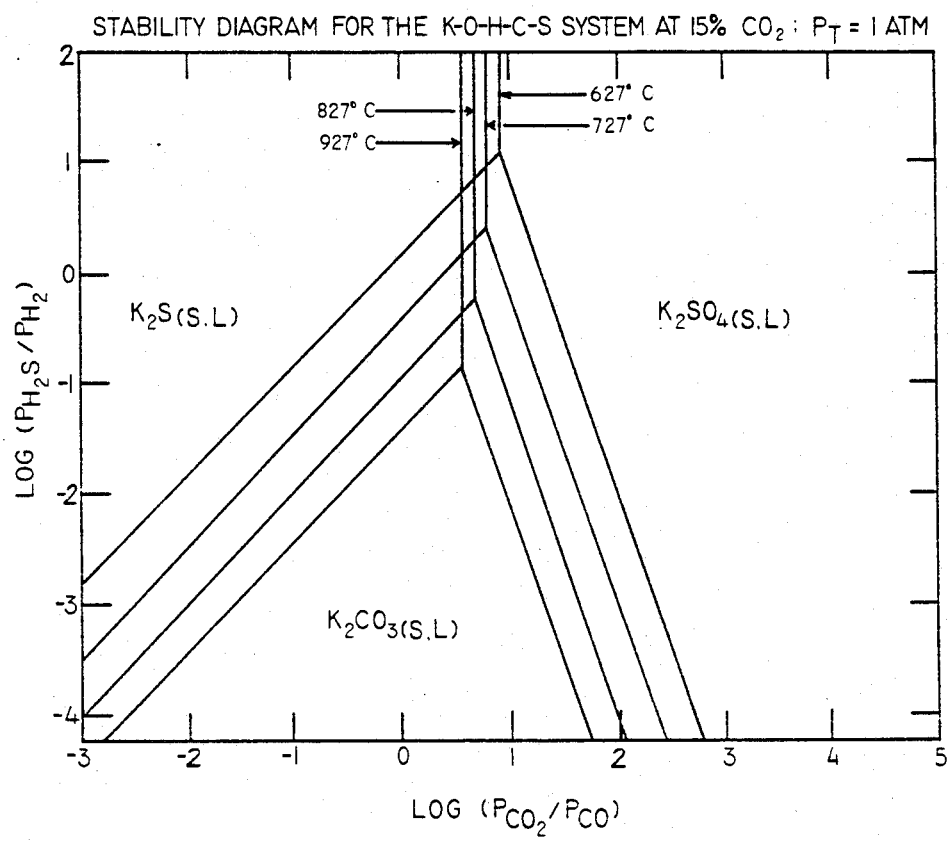
FIG. 3 is a series of phase stability diagrams exemplifying the effect of temperature.

When reducing gases are used, these may be selected from the group consisting of hydrogen and carbon monoxide, and hydrocarbons which are in the gas phase at the reaction temperature. Of these, the low molecular weight aliphatic alkanes are probably of most interest. It is essential that the gases selected provide both carbon, for the formation of carbonates, and hydrogen for the formation of H_2S. An example of the hydrocarbon gas reaction is shown in reaction (9) above. As will be understood by those skilled in the art, equilibrium conditions among the gaseous reactants will be established during the reaction, dependent upon the temperature and pressure of the reaction, and these should be such that the stable solid phase in equilibrium with this gas phase is K_2CO_3 an example of which is shown in FIG. 2. The boundaries of the K_2CO_3 field change with temperature, becoming more limited as temperature is increased as shown in FIG. 3.

Temperature is a critical parameter and should be between about 600° C. and about 1000° C., preferably between about 750° C. and about 850, namely high enough to allow reasonable kinetics without entering the region of fusion and appreciable vapor pressure of the solid reactants and products.

Reaction time for reactions conducted in a furnace should be between about 15 minutes and about 5 hours, preferably between about 30 minutes and about 1 hour. When the reaction is conducted in a fluid bed reactor, reaction time should be between about 15 minutes and about 5 hours, preferably between about 15 minutes and about 1 hour.

In a preferred embodiment, coal is burned in the presence of air and steam to provide both the heat for the reactions and the reducing gases used as feed to the reactor.

By the process of this invention, up to 98.6% conversion of alkali metal sulfates to the corresponding carbonates can be achieved.

5. Barium oxide alkali metal hydroxide regeneration.

The following described process is suitable not only for use with the above-described potassium hydroxide alunite leach of the present invention, but also may be used in connection with alkali metal hydroxide leaches of any ores wherein it is desired to convert alkali metal sulfates to the corresponding hydroxides for recycle to the leach, preferably wherein the alkali metal and sulfur values required are found in the ore itself. The process may be used, for instance, in a combined sodium hydroxide/potassium hydroxide leach of alunite or other ores.

In the process of this embodiment, alkali metal sulfate is reacted with barium oxide and water (the barium oxide may be pre-hydrated to form the hydroxide or added to the solution as unhydrated barium oxide) to directly form the alkali metal hydroxide and insoluble barium sulfate. After a liquid/solid separation step, the barium sulfate is then reacted with a carbonaceous fuel at an elevated temperature, preferably around 1200° C. to form solid barium sulfide and carbon dioxide, which products react together with water to form a barium carbonate precipitate and hydrogen sulfide offgas. The barium carbonate precipitate is then reacted with coal or coke at an elevated temperature, preferably about 1100° C. to regenerate barium oxide for recycle to the process and carbon monoxide which may also be recycled to the process.

Referring to FIG. 1, which is a general diagrammatic flow sheet of the preferred embodiment of the invention, the alunite ore is processed in the following steps.

1. Ore Preparation

The alunite feed ore is advantageously physically reduced in size by crushing and/or grinding in ore preparation 1, e.g. crushed to approximately minus ⅜-inch material and ground to approximately 20-mesh. In a preferred embodiment, a pre-leach solution of KOH is added to the final grinding of the crushed/ground ore product during which an approximately minus 20-mesh Tyler product is achieved. This KOH-preleach solution may advantageously be the spent leach liquor from the primary leach 2, described below. The pre-leached slurry is then sent to the primary leach 2.

2. Primary Leach

The ore slurry from the preparation 1, undergoes a primary leach 2, typically a single stage leach, with a strong KOH leach solution, saturated with $K_2SO_4$. For purposes of this invention a "strong" KOH leach is one containing a concentration of KOH remaining in the spent primary leach from about 160 to about 240 grams KOH/liter of solution, preferably from about 180 to about 200 grams KOH/liter, and most preferably about 180 grams KOH/liter. The key reaction taking place during the primary leach is:

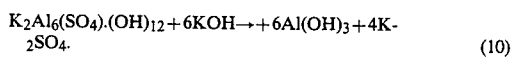

$$K_2Al_6(SO_4).(OH)_{12} + 6KOH \rightarrow + 6Al(OH)_3 + 4K_2SO_4. \qquad (10)$$

It has been discovered that the aluminum values can be selectively taken into solution leaving the potassium values from the ore in the leach residue by utilizing a KOH leach solution which is initially saturated with potassium sulfate prior to the leaching 2. Additionally, it has been discovered that by contacting the ore with a primary leach comprising $K_2SO_4$-saturated KOH, the potassium values in the residue, although not solubilized into the leachate, will nevertheless be rendered water soluble and thus easily recoverable in a subsequent wash or leach. Moreover, by selection of proper leach conditions of time and temperature above 60° C., minimal loss of aluminum values due to precipitation of aluminosilicates can be achieved despite the substantial amount of silica in the prepared ore.

The concentration of $K_2SO_4$ in the leach solution is sufficient to saturate the solution under the particular conditions, but will typically be from about 20 to about 30 grams $K_2SO_4$/liter. The KOH leach liquor may advantageously comprise at least in part the spent liquor 18 returning from the $K_2SO_4$ recovery 5. Approximately 90% of the aluminum values are solubilized in the primary leach 2. Also, 95% of the sulfur and potassium values of the alunite ore are rendered water soluble, but remain in the residue 13. The liquor 10 containing the dissolved aluminum is sent to alumina recovery 3 and the residue 13 is sent to a secondary leach 4. The primary leach 2 is conducted at a temperature above 60° C., typically from about 80° C. to about 150° C., preferably at about 95° C., with a retention time of from about 2 minutes to about 2 hours, preferably about 30 minutes.

To minimize loss of aluminum values due to precipitation of insoluble aluminosilicates, the conditions of time and temperature can vary inversely. At higher temperatures leaching is for shorter periods of time, e.g. 130° C. for 3 minutes. However as will be known and understood by those skilled in the art, loss of aluminum as precipitated aluminosilicates can be balanced by other overall factors and thus technical operability of the leach system can be achieved over the entire ranges of temperatures and times provided. The concentration of KOH in the leachate 10 after the primary leach 2 is from about 140 to 220 grams KOH/liter, preferably from about 160 to about 200 grams KOH/liter and typically about 180 grams KOH/liter.

3. $Al_2O_3$ Recovery

The primary leachate 10, i.e. the aluminum-laden liquor from the primary leach, contains dissolved silicates. It is desirable to obtain a pure grade alumina from the leachate by direct crystallization. However, the presence of dissolved silicates in the leachate would result in unacceptable silica contamination of the crystals and thus the leachate must be be desilicated prior to crystallization. The leachate is typically supersaturated and as such requires seeding in order to desilicate. According to the present invention effective desilication of the leachate is accomplished by contacting or seeding the leachate with CaO to precipitate out the silica as insoluble silicates.

Desilication is accomplished by heating the aluminum-laden leachate above about 100° C., preferably to a temperature of from about 180° to about 200° C. To this heated leachate is added CaO, typically as a $Ca(OH)_2$ slurry. The $Ca(OH)_2$ concentration in the aluminum-laden leachate is from about 12 to about 20 grams of $Ca(OH)_2$ per liter of leachate. The retention time is from about 5 to about 30 minutes. After the retention time, the precipitated desilication product (DSP) 11 is separated from the leachate and sent to disposal.

The silicate precipitant is separated from the leachate liquor, typically by filtration. The resulting liquor may then be processed according to methods known in the art. Typically, the liquor is sent to aluminum trihydrate precipitators followed by slurry classification and washing. The course hydrate formed during trihydrate precipitation is thickened, filtered, washed, and calcined to form the final $Al_2O_3$ product. The fine hydrate is returned to the precipitators for seed $Al(OH)_3$. The KOH liquor 12 remaining after the aluminum trihydrate precipitation is advantageously recycled to the primary leach 2.

4. Secondary Leach

In the preferred embodiment, the residue 13 is slurried and/or leached with water to solubilize the potassium and sulfur values contained in the residue. Advantageously, spent liquor 18 returning from the $K_2SO_4$ precipitation 5, described below, may comprise part of the slurried solution. The secondary leach 4 is typically a two-stage countercurrent leach wherein the potassium and sulfate values solubilize into the liquor secondary leachate 14. The secondary leachate 14 and remaining solid ore residue tails 15 are separated, typically by thickening and filtration. The residue tails 15 may be further washed, e.g. with water, to recover additional soluble potassium and/or sulfur values. The washed non-toxic residue tails 15 from this leach may be sent to a tailings pond for disposal. In a preferred embodiment, the secondary leachate 14 is divided into at least two streams 16 and 17, with one stream 16 being sent to $K_2SO_4$ crystallization 5, and the other portion 17 being sent to $K_2CO_3$ generation 6, both of these steps being described below.

5. $K_2SO_4$ Recovery

In the preferred embodiment, a portion of the secondary leachate 16 from the secondary leach containing dissolved potassium and sulfate is treated for recovery of solid $K_2SO_4$ by crystallization 5. The crystallization may be by any means known in the art, typically by utilizing a vacuum cooled crystallizer, operating at a crystallization temperature of about 40° C. As will be known and understood by those skilled in the art, the leachate from the secondary leach may have varying amounts of $K_2SO_4$, e.g. from about 12% to about 18% $K_2SO_4$. After crystallization, the crystallized $K_2SO_4$ 19 is separated from the spent liquor by means known in the art. The spent liquor 18 typically containing about 8% to about 12%, more typically about 10% residual $K_2SO_4$ is advantageously returned to the secondary leach circuit 4. The crystallized $K_2SO_4$ 19 may be further processed according to means known in the art, such as centrifuging, compacting, and drying for commercial use.

6. $K_2CO_3$ Generation

In another preferred embodiment, a portion of the secondary leachate solution 17 containing dissolved potassium and sulfate is processed to generate $K_2CO_3$ and ultimately to regenerate KOH. The secondary leachate 17, typically containing about 12% to about 18% $K_2SO_4$, is reacted with a lime slurry $(Ca(OH)_2)$ 20 and $H_2S$ gas in a gas/liquid contacting device capable of handling solids, e.g. a spray tower, to form solid gypsum, $CaSO_4.2H_2O$, and soluble $K_2S$ and KHS. The $H_2S$ gas concentration is not critical. Contact with $K_2SO_4$ results in the formation of gypsum which is separated from the spent liquor typically by countercurrent decantation (CCD) followed by vacuum filtration. The gypsum tailings 24 can be sent to a disposal pond. The $K_2S$ and KHS liquor is sent to an absorption tower where $CO_2$ is absorbed forming $KHCO_3$ and $H_2S$. The concentration of $CO_2$ typically required for this step is about 20%. The $H_2S$ is recycled to the spray tower described above for forming gypsum and soluble $K_2S$. The $KHCO_3$ solution is steam stripped to release one-half of the $CO_2$ required for $K_2S$ carbonation, the balance of $CO_2$ being supplied from the lime regeneration 8, described below. Aqueous $K_2CO_3$ 21 is formed when the $KHCO_3$ is steam stripped. The $K_2CO_3$ 21 is then sent to the causticization 7, described below.

7. Causticization - KOH Regeneration

In one preferred embodiment, causticization 7 of aqueous $K_2CO_3$ by reaction with lime (CaO) is effected to produce KOH. The causticization is performed on the aqueous $K_2CO_3$ utilizing countercurrent methods, preferably at a temperature of from about 85° to about 95° C. The products of causticization are a solution of approximately 12%–15% KOH 23 and precipitated limestone, $CaCO_3$ 24. The $CaCO_3$ precipitate 24 is sent to lime regeneration 8, described below, and the KOH solution 23 is advantageously recycled to the primary leach 2.

8. Lime Regeneration

In the preferred embodiment, regeneration of lime, CaO 8, from precipitated $CaCO_3$ 24 is accomplished by calcining the $CaCO_3$ limestone formed during causticization 7, typically at a temperature of from about 800° to about 1200° C. and for a time sufficient to convert $CaCO_3$ to CaO. The CaO 25 is then recycled for use in the causticization 7.

9. Impurities Control

A bleed stream 26 for controlling impurities of the primary leach 2 is taken from the KOH liquor 12 remaining after $Al_2O_3$ recovery 3 and before recycling this liquor 12 back to the primary leach. An alternative, and/or additional, point at which a bleed stream may be taken in the primary leach circuit is 27, in which a bleed stream from the alumina-containing primary leachate 10 is sent to impurities control 9. The treated bleed stream 28 may then be returned to the primary leach 2.

A bleed stream from the secondary leach circuit may be taken from either or both of two points in the secondary circuit. A bleed stream 29 for controlling impurities, primarily excessive KOH buildup, may be taken from the $K_2SO_4$ liquor 18 returning to the secondary leach 4 after $K_2SO_4$ recovery 5, with the bleed stream 29 returning to the primary leach 2. An alternative, and/or additional, point at which a stream may be taken in the secondary leach circuit is 30, from a portion of the $K_2SO_4$ leachate 14. This bleed stream is also sent to the primary leach 2.

FIG. 2 shows a stability diagram for the K-O-H-C-S system of the pyrohydrolysis KOH regeneration described herein at 15% $CO_2$ and $P_t = 1$ atm. Referring to FIG. 2, the log of the pressure of $H_2S$ divided by the pressure of $H_2$ is plotted on the Y axis. The log of the pressure of $CO_2$ divided by the pressure of CO is plotted on the X axis. For a given temperature, such a stability diagram can be constructed. In order to produce $K_2CO_3$, the equilibrium gas composition in a system must fall within the $K_2CO_3$ stability field given by a diagram such as FIG. 2. The selected temperature is desired to be below the fusion point of the $K_2SO_4$ and $K_2CO_3$, and above about 700° C.

As will be understood by those skilled in the art, modifications of the above process may be made without departing from the scope of the invention. The following examples are provided for illustration and not by way of limitation.

Example 1

A series of experiments was performed on a sample of Utah alunite ore. The sample is believed to be representative of the high grade core of the NG ore deposit near Cedar City, Utah. Table 1 shows the chemical analysis of this sample. The sample was stage crushed to minus 20 mesh and dried for 24 hours at 110° C. in preparation for conducting the experiments.

TABLE 1

| Element | % |
|---|---|
| Al | 9.74 |
| S | 7.53 |
| K | 4.17 |
| Na | 0.230 |
| Ca | 0.094 |
| Mg | 0.017 |
| Fe | 0.742 |
| Si | 23.0 |

TABLE 1-continued

| Element | % |
| --- | --- |
| Ga | 0.002 |
| Total organic carbon (TOC) | 1.81 |

Example 2

Leach tests were conducted to examine the effects of time, temperature, and KOH concentration on aluminum, potassium and sulfur extraction. Most of the leach tests conducted report aluminum, potassium, and sulfur extraction results. The primary KOH leach is intended to solubilize only aluminum, not potassium and sulfur. During the KOH leach, however, the potassium and sulfur in the residue are rendered water soluble (as free potassium sulfate). The leaching technique used in the tests comprised filtration of the slurry after agitation at specified time and temperature, followed by at least four water washes. The water soluble $K_2SO_4$ is thus solubilized and usually collected with the aluminum bearing primary filtrate. Hence total aluminum, potassium, and sulfur extractions are reported in a single leach. These are considered representative of total extractions attainable in the two-step leach process.

Figure 4:
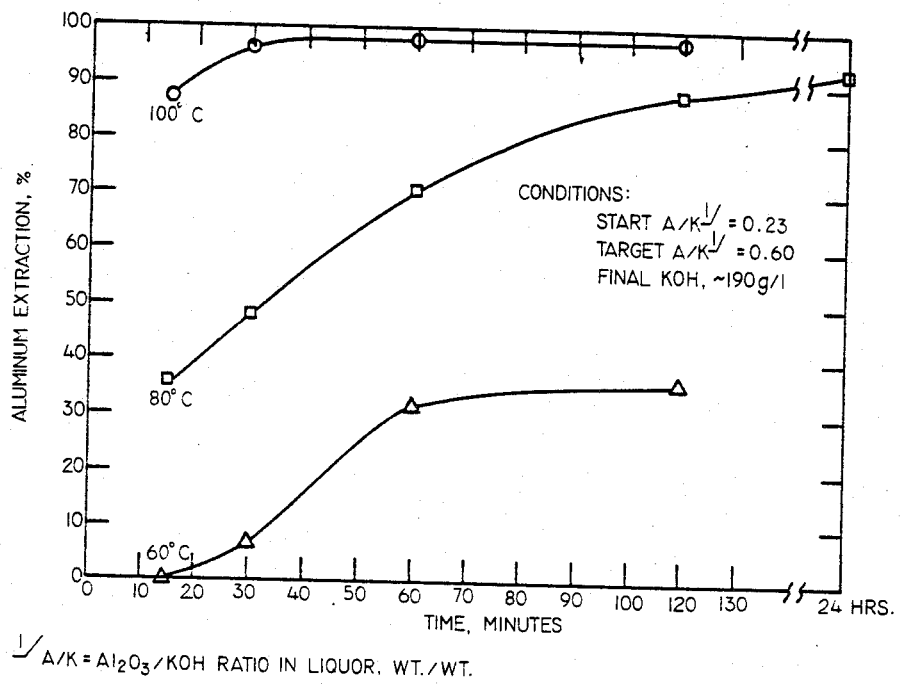
FIG. 4 is a plot of aluminum extraction versus time at 60° C., 80° C. and 100° C.

Table 2 summarizes conditions and results for the leach tests performed. Aluminum extraction results versus time at 60° C., 80° C. and 100° C. are plotted in FIG. 4.

TABLE 2

Leach Test Conditions and Results

| | | Conditions | | | | Extraction (g/l) | | | | Available Alumina |
| --- | --- | --- | --- | --- | --- | --- | --- | --- | --- | --- |
| | | Initial | | Temp | Time | | | | | |
| No. | Feed | KOH Conc | × Stoich | °C. | min | Al | S | K | Na | % |
| A | Raw ore | (pH 10.0) | | 90 | 5 | | No reaction | | | |
| | | | | | 10 | | | | | |
| | | | | | 20 | | | | | |
| | | | | | 60 | | | | | |
| | | | | | 120 | | | | | |
| B | Dehydrated ore | (pH 10.0) | | 70 | 60 | 11.4 | 75.9 | 74.5 | | |
| C | Raw ore | 10% | 1.4 | 90 | 5 | 0.0 | 13.2 | 16.5 | 25.6 | 93.2 |
| D | | | | | 10 | 0.0 | 15.3 | 18.1 | 28.5 | 93.8 |
| E | | | | | 40 | 34.7 | 51.9 | 43.5 | 55.0 | 89.2 |
| F | Raw ore | 18% | 2.8 | 90 | 5 | 27.3 | 41.3 | 42.0 | | 91.3 |
| G | | | | | 15 | 82.1 | 90.3 | 89.4 | | 60.2 |
| H | | | | | 40 | 83.3 | 94.5 | 93.8 | | — |
| I | Raw ore | 10% | 1.4 | 130 | 2 | 23.1 | 40.5 | 39.7 | | 91.3 |
| J | | | | | 5 | 30.3 | 44.5 | 44.4 | | 91.4 |
| K | | | | | 10 | 30.2 | 45.4 | 45.4 | | 89.8 |
| L | Raw ore | 18% | 2.8 | 150 | 2 | 26.5 | 42.0 | 43.4 | | 90.4 |
| M | | | | | 5 | 25.6 | 47.2 | 47.0 | | — |
| N | | | | | 10 | 13.3 | 60.4 | 57.5 | | 62.5 |

| Leach No. | KOH Conc. g/l (× Stoich) | Temp °C. | Time min | Sample | Assay, % or g/l | | | | | % Extraction (Accountability) | | |
| --- | --- | --- | --- | --- | --- | --- | --- | --- | --- | --- | --- | --- |
| | | | | | Al | S | K | Na | Si | Al | S | K |
| 1 | 178 (4.1) | 100 | 15 | Mother liquor | 28.8 | 0.715 | — | 0.187 | 0.031 | | | |
| | | | | Head | 10.0 | 7.38 | 3.98 | 0.225 | 23.0 | | | |
| | | | | Residue | 2.24 | 1.13 | 0.617 | 0.059 | — | 87.5 | 91.8 | 91.4 |
| | | | | Filtrate & wash | 12.6 | 4.57 | — | 0.613 | 0.05 | (100.2) | (100.6) | |
| 2 | 174 (4.1) | 100 | 30 | Mother liquor | 28.8 | 0.715 | — | 0.187 | 0.031 | | | |
| | | | | Head | 10.0 | 7.38 | 3.98 | 0.225 | | | | |
| | | | | Residue | 1.41 | 0.463 | 0.308 | 0.047 | — | 96.4 | 96.8 | 95.9 |
| | | | | Filtrate & wash | 10.9 | 4.72 | — | 0.165 | 0.056 | (85.8) | (99.4) | |
| 3 | 171 (4.1) | 100 | 60 | Mother liquor | 28.8 | 0.715 | — | 0.187 | 0.031 | | | |
| | | | | Head | 10.0 | 7.38 | 3.98 | 0.225 | | | | |
| | | | | Residue | 1.13 | 0.317 | 0.301 | 0.046 | — | 97.1 | 98.1 | 96.0 |
| | | | | Filtrate & wash | 12.6 | 4.87 | — | 0.172 | | (96.3) | (99.8) | |
| 4 | 167 (4.1) | 100 | 120 | Mother liquor | 28.8 | 0.715 | — | 0.187 | 0.031 | | | |
| | | | | Head | 10.0 | 7.38 | 3.98 | 0.225 | | | | |
| | | | | Residue | 1.04 | 0.253 | 0.257 | 0.045 | — | 97.4 | 98.3 | 96.6 |
| | | | | Filtrate & wash | 11.1 | 4.35 | — | 0.154 | 0.100 | (95.6) | (100.3) | |
| 5 | 231 (4.4) | 60 | 15 | Mother liquor | 28.6 | [2] | — | — | — | | | |
| | | | | Head | 9.81 | | — | — | — | | | |
| | | | | Residue | — | — | — | — | — | | | |
| | | | | Filtrate & wash | 6.82 | — | — | — | — | 0.3[1] | | |
| 6 | 226 (4.4) | 60 | 30 | Mother liquor | 28.6 | [2] | — | — | — | | | |
| | | | | Head | 9.81 | | — | — | — | | | |
| | | | | Residue | — | — | — | — | — | | | |
| | | | | Filtrate & wash | 7.19 | — | — | — | — | 6.1[1] | | |
| 7 | 221 (4.4) | 60 | 60 | Mother liquor | 28.6 | — | — | — | — | | | |
| | | | | Head | 9.81 | — | — | — | — | | | |
| | | | | Residue | — | — | — | — | — | | | |
| | | | | Filtrate & wash | 8.83 | — | — | — | — | 33.4[1] | | |
| 8 | 220 (4.4) | 60 | 120 | Mother liquor | 28.6 | — | — | — | — | | | |
| | | | | Head | 9.81 | — | — | — | — | | | |
| | | | | Residue | — | — | — | — | — | | | |
| | | | | Filtrate & wash | 8.83 | — | — | — | — | 38.4[1] | | |
| 9 | 209 (4.2) | 80 | 15 | Mother liquor | 28.6 | — | — | 0.195 | — | | | |
| | | | | Head | 9.81 | 7.25 | 3.87 | 0.227 | — | | | |
| | | | | Residue | 7.82 | 5.91 | 3.30 | 0.212 | — | 35.6 | 32.4 | 29.0 |

TABLE 2-continued

Leach Test Conditions and Results

| | | | | Sample | Al | S | K | Na | Si | Al | S | K |
|---|---|---|---|---|---|---|---|---|---|---|---|---|
| | | | | Filtrate & wash | 7.85 | 1.76 | — | — | — | (98.0) | (107.6) | |
| 10 | 214 (4.2) | 80 | 30 | Mother liquor | 28.6 | — | — | 0.195 | — | | | |
| | | | | Head | 9.81 | 7.25 | 3.87 | 0.227 | — | | | |
| | | | | Residue | 6.74 | 5.04 | 2.64 | 0.148 | | 47.8 | 47.0 | 48.0 |
| | | | | Filtrate & wash | 8.68 | 2.05 | — | — | — | (97.1) | (98.7) | |
| 11 | 197 (4.2) | 80 | 60 | Mother liquor | 28.6 | — | — | 0.195 | — | | | |
| | | | | Head | 9.81 | 7.25 | 3.87 | 0.227 | — | | | |
| | | | | Residue | 4.42 | 2.88 | 1.58 | 0.100 | — | 71.4 | 74.9 | 74.1 |
| | | | | Filtrate & wash | 9.85 | 3.76 | — | — | — | (94.3) | (107.9) | |
| 12 | 179 (4.2) | 80 | 60 | Mother liquor | 28.6 | — | — | 0.195 | — | | | |
| | | | | Head | 9.81 | 7.25 | 3.87 | 0.227 | — | | | |
| | | | | Residue | 2.14 | 0.909 | 0.606 | 0.059 | — | 88.1 | 93.0 | 91.4 |
| | | | | Filtrate & wash | 12.1 | 4.35 | — | — | — | (102.8) | (101.6) | |
| 13 | 197 (5.4) | 100 | 30 | Mother liquor | 28.6 | — | — | 0.195 | — | | | |
| | | | | Head | 9.81 | 7.25 | 3.87 | 0.227 | — | | | |
| | | | | Residue | 1.41 | 0.311 | 0.410 | 0.049 | — | 92.5 | 98.0 | 94.4 |
| | | | | Filtrate & wash | 11.6 | 3.52 | — | 0.143 | 0.054 | (106.0) | (98.8) | |
| 14 | 176 (3.5) | 100 | 30 | Mother liquor | 28.6 | 0.0 | — | 0.194 | 0.029 | | | |
| | | | | Head | 9.81 | 7.25 | 3.87 | 0.227 | — | | | |
| | | | | Residue | 1.95 | 0.692 | 0.406 | 0.056 | — | 89.2 | 94.9 | 94.3 |
| | | | | Filtrate & wash | 12.0 | 5.32 | — | 0.155 | 0.061 | (92.3) | (100.8) | |
| 15 | 185 (3.8) | 100 | 30 | Mother liquor | 28.6 | 0.0 | — | 0.195 | 0.029 | | | |
| | | | | Head | 9.81 | 7.25 | 3.87 | 0.227 | — | | | |
| | | | | Residue | 1.67 | 0.528 | 0.316 | 0.053 | — | 90.8 | 96.2 | 95.6 |
| | | | | Filtrate & wash | 13.6[1] | 4.86 | — | 0.172 | 0.060 | (106.2) | (98.0) | |

[1] Calculated from the filtrate assay.
[2] Samples in leach nos. 5–8 were analyzed only for aluminum since it was apparent from weight loss and A/K titration results that poor extractions had been achieved.

Example 3

Leach tests were conducted to determine the effect of KOH concentration on $SiO_2$ attack and on aluminum extraction. The results are shown in Table 3.

TABLE 3

Leach Test Conditions and Results

| Leach No. | KOH Conc. g/l (× Stoich) | Temp °C. | Time min | Sample | Al | S | K | Na | Si | Al | S | K |
|---|---|---|---|---|---|---|---|---|---|---|---|---|
| 1 | 160 (3.4) | 100 | 30 | Syn. spent liquor | 21.2 | — | — | 0.178 | 0.08 | | | |
| | | | | Head | 10.3 | 7.46 | 4.13 | 0.281 | — | | | |
| | | | | Residue | 2.11 | 0.84 | 0.47 | 0.069 | | 88.7 | 94.7 | 93.7 |
| | | | | Filtrate & wash | 12.8 | 6.46 | | 0.212 | 0.45 | (103.3) | | |
| 2 | 200 (3.4) | 100 | 30 | Syn. spent liquor | 27.6 | — | — | 0.245 | 0.13 | | | |
| | | | | Head | 10.3 | 7.46 | 4.13 | 0.178 | 0.08 | | | |
| | | | | Residue | 1.86 | 1.27 | 1.76 | 0.050 | | 88.9 | 86.1 | 76.1 |
| | | | | Filtrate & wash | 16.7 | 7.78 | | 0.252 | 0.74 | (104.4) | | |
| 3 | 220 (3.4) | 100 | 30 | Syn. spent liquor | 31.2 | — | — | 0.245 | 0.12 | | | |
| | | | | Head | 10.3 | 7.46 | 4.13 | 0.281 | — | | | |
| | | | | Residue | 0.680 | 0.66 | 0.47 | 0.51 | | 90.5 | 95.3 | 93.9 |
| | | | | Filtrate & wash | 17.7 | 8.70 | | 0.288 | 0.91 | (98.6) | | |
| 4 | 180 (3.4) | 100 | 30 | Syn. spent liquor | 25.1 | — | — | 0.202 | 0.14 | | | |
| | | | | Head | 10.1 | 7.46 | 4.13 | 0.281 | | | | |
| | | | | Residue | 1.98 | 0.79 | 0.46 | 0.053 | | 84.4 | 94.2 | 93.9 |
| | | | | Filtrate & wash | 14.4 | 6.92 | | 0.231 | 0.56 | (98.6) | | |

*Mass balance based upon $Al_2O_3$/KOH ratio which for the leaches gave a more accurate number than when based upon the Al analysis.

TABLE 4

| | Assay, % or g/l | | | | | % Extraction | | |
|---|---|---|---|---|---|---|---|---|
| Sample | Al | S | K | Na | Si | Al | S | K |
| Mother liquor | 26.0 | 7.39 | — | 0.190 | 0.06 | | | |
| Head | 10.1 | — | 3.97 | 0.241 | — | | | |
| Residue | 1.96 | 0.93 | 0.89 | 0.63 | — | 89.3 | 93.2 | 87.8 |
| Filtrate & wash | 9.64 | 3.5 | — | 0.141 | 0.09 | (97.6) | (94.6) | |
| | (Accountability, %) | | | | | | | |

Example 4

A leach test was conducted to determine the result of $K_2CO_3$ contamination of the leach liquor. A standard leach was conducted with the leach KOH concentration of 197 g/l (KOH stoichiometric multiple 4.3) and 20% $K_2CO_3$; temperature 100° C.; and leach time 30 minutes. The test showed that aluminum extraction is decreased and that $SiO_2$ extraction is increased by the addition of 20% $K_2CO_3$ to the leach liquor. The results are shown in Table 4.

Example 5

A leach test was conducted to determine the effect of long holding time on extraction of values and $SiO_2$ levels. A standard leach was conducted with the leach KOH concentration 233 g/l (KOH stoichiometric multiple 4.3); temperature at 100° C.; and leach time 30 minutes. The resulting slurry was maintained at 80° C. for 24 hours. The purpose of this approach was to determine if long holding time in thickeners might be a problem due to desilication reactions. Aluminum extraction was not affected, but SiO₂ level in the liquor increased. The results are shown in Table 5.

TABLE 5

| Sample | Assay, % or g/l | | | | | % Extraction | | |
|---|---|---|---|---|---|---|---|---|
| | Al | S | K | Na | Si | Al | S | K |
| Mother liquor | 26.0 | 7.39 | — | 0.190 | 0.06 | | | |
| Head | 10.1 | — | 3.97 | 0.241 | — | | | |
| Residue | 1.34 | 0.207 | 0.365 | 0.049 | — | 93.1 | 98.6 | 95.2 |
| Filtrate & wash | 10.9 | 4.15 | — | 0.170 | 0.16 | | | |
| | (Accountability, %) | | | | | (92.9) | (92.9) | |

Example 6

Tests were designed to study the effect of target A/K ratio on the extraction of the Al, K, and S values. The target A/K ratio is defined as the weight ratio of $Al_2O_3$ to KOH which will result in the liquor if 100% of the aluminum is extracted and KOH is consumed stoichiometrically according to the reaction, $$Al_2(SO_4)_3 + 6KOH \rightarrow 2Al(OH)_3 + 3K_2SO_4$$

The target A/K can be thought of as an ore charge ratio for the leach. High final ratios (the final A/K ratio achieved) are desirable for liquor productivity but must be consistent with high extraction objectives.

Table 6 shows the test results in terms of Al, K, and S extraction as a function of target A/K ratio. Table 7 shows Al extraction as a function of final ratio (A/K ratio actually achieved). These results illustrate that extraction of values is an inverse function with respect to target A/K ratio, as well as final ratio, though the effect is not dramatic in the range of A/K ratios studied. A slight increase in SiO₂ in the liquor results in increased target A/K, as shown in Table 8.

The results indicate that the target A/K ratio is advantageously chosen by economic analysis in addition to technical aspects. A target ratio of 0.6 was used for most of the standard tests in these Examples.

TABLE 6

| A/K Final Filtrate Target Ratio | Al % | K % | S % |
|---|---|---|---|
| 0.5 | 92 | 95 | 98 |
| 0.6 | 91 | 95 | 96 |
| 0.7 | 89 | 95 | 95 |

*Conditions: 100° C. for 30 minutes, final KOH, approximately 190 g/l.
**All figures rounded off.

TABLE 7

| A/K Final Filtrate Actual Ratio | Al % |
|---|---|
| 0.5 | 92 |
| 0.6 | 91 |
| 0.7 | 90 |

*Conditions: 100° C. for 30 minutes, final KOH, approximately 190 g/l.
**All figures rounded off.

TABLE 8

| A/K Final Filtrate Target Ratio | SiO₂ g/l in filtrate |
|---|---|
| 0.5 | 0.52 |
| 0.6 | 0.55 |

TABLE 8-continued

| A/K Final Filtrate Target Ratio | SiO₂ g/l in filtrate |
|---|---|
| 0.7 | 0.59 |

*Conditions: 100° C. for 30 minutes, final KOH, approximately 190 g/l.
**All figures rounded off.

EXAMPLE 7

Aluminum hydroxide precipitate was spectrochemically analyzed and the results compared with spectrochemical analyses of the ore for the same elements. Results are set forth in Table 9.

TABLE 9

Semiquantitative Emission Spectrochemical Analysis of Ore and Al(OH)₃ Precipitate

| Element | Analysis | |
|---|---|---|
| | Ore | Precipitate |
| Silicon | Major[2] | 0.01 |
| Aluminum | 10 | Major |
| Iron | 1 | 0.03 |
| Calcium | 0.1 | 0.01 |
| Magnesium | 0.01 | — |
| Sodium | 4.0 | — |
| Titanium | 0.3 | — |
| Manganese | 0.002 | — |
| Chromium | 0.01 | — |
| Copper | 0.001 | 0.0003 |
| Nickel | 0.1 | — |
| Lead | 0.1 | — |
| Zinc | — | 0.1 |
| Molybdenum | 0.1 | — |
| Vanadium | 0.003 | — |
| Strontium | 0.01 | — |
| Barium | 0.005 | — |

[1] Analysis expressed as a weight percentage - estimate only.
[2] Major represents a concentration above 10%.

EXAMPLE 8

A series of tests was performed to determine the impurity buildup on recycling use of the leach liquors. The tests were conducted in a manner to simulate the parameters outlined in the detailed description portion of this specification. This testing did not, however, include regeneration of KOH from K₂SO₄. Thirteen cycles utilizing the leach liquors were conducted and evaluated.

The test conditions were as follows: In Cycle 1, the alunite ore was leached for 30 minutes at 100° C., filtered, and washed three times with H₂O. The residue was repulped with 400cc H₂O at 90° C., filtered, and washed with 40° C. H₂O. Reagent Al(OH)₃ was added as a seed to the pregnant liquor. This was mixed for 22 hours at 60° C., filtered, washed three times with 75cc H₂O followed by a separate H₂O wash. In Cycles 2–12 the ore was leached with spent liquor for 30 minutes at 100° C.; then cooled to 60° C.; filtered and washed with 60 cc H₂O. The leach residue was repulped with barren K₂SO₄ liquor (excess K₂SO₄ filtered out) at 90° C., filtered and washed with 40° C. H₂O. This filtrate was evaporated to approximately 200 cc, cooled to 40° C., filtered and washed with H₂O. Al(OH)₃ seed from the previous cycle was added to the leach filtrate, mixed 22 hours at 60° C., filtered and washed with H₂O. In Cycle 13, 5 cc, 1 g/l Polyox 301 was added to the leached ore after it cooled to 60° C. The leach filtrate was boiled for 24 hours, filtered, and washed with H₂O. The leach residue was repulped with barren K₂SO₄ solution at 90° C. This repulped residue was filtered, and the residue again repulped with $H_2O$ at 90° C. for approximately 10 minutes, then filtered and washed three times with $H_2O$.

Results of the impurities build-up tests are summarized in Table 10. The spent liquor of Cycle 13, stream 5, is given in Table 11. Analyses of the products are summarized in Table 12.

Definition of streams:

Stream 1 is the leachate, containing the dissolved aluminum, following the primary KOH leach and filtration separation of the residue from the leachate.

Stream 2 is the liquor resulting from the separation of the precipitated $Al(OH)_3$.

Stream 3 is the resulting liquor from the secondary leach of wash of the residue containing the potassium and sulfur values, after repulping and filtering the excess $K_2SO_4$.

Stream 4 is the returning liquor following separation of $K_2SO_4$.

TABLE 11

Analysis of Cycle 13 Spent Liquor Stream 5

| Species | Analysis ppm |
|---|---|
| Ga | 31 |
| B | 135 |
| P | 533 |
| Ca | 1 |
| Mg | 1 |
| $Cl^-$ | 11 |
| Ti | 1 |
| Cr | 5.5 |
| Mn | 0.5 |
| Ni | 5.7 |
| Fe | 6.7 |
| Pb | 14.0 |
| Cu | 1.5 |
| Zn | 1.2 |
| V | 129 |
| $C_2O_4^=$ (oxalate) | 8.6 |
| Total organic carbon | 70 |

TABLE 10

Analysis of Liquors, g/l

| Cycle No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Leach | Al | 51.0 | 48.9 | 57.1 | 50.8 | 48.1 | 49 | 49 | 50.0 | 42.5 | 46.3 | 50.0 | 43.7 | 48.6 |
| liquor | K | 121 | 119 | 106 | 105 | 112 | 105 | 115 | 116 | 116 | 114 | 118 | 115 | — |
| (Stream #1) | Na | 0.745 | 1.35 | 1.88 | 2.35 | 3.04 | 2.94 | 3.14 | 3.33 | 3.59 | 3.54 | 3.50 | 3.59 | 3.78 |
| | S | 7.74 | 7.41 | 8.11 | 5.44 | 5.44 | 4.27 | 4.57 | 4.80 | 4.54 | 4.78 | 4.31 | 4.68 | 5.44 |
| | Si | 0.27 | 0.45 | 0.86 | 1.00 | 0.82 | 1.09 | 1.0 | 1.0 | 1.05 | 1.12 | 1.09 | 1.04 | 0.97 |
| Spent liquor | Al | 16.2 | 24.5 | 25.6 | 20.8 | 21.4 | 22.5 | 23.8 | 27.5 | 25.0 | 23.8 | 27.5 | 25.0 | 21.0 |
| (Stream #2) | K | 111 | 101 | 115 | 105 | 109 | 109 | 118 | 118 | 116 | 116 | 116 | 116 | — |
| | Na | 0.763 | 1.38 | 2.03 | 2.45 | 2.70 | 2.84 | 3.04 | 3.33 | 3.59 | 3.50 | 3.35 | 3.52 | 3.83 |
| | S | 5.30 | 5.04 | 4.34 | 5.34 | 4.87 | 5.04 | 5.43 | 4.74 | 4.54 | 4.78 | 4.04 | 4.54 | 5.41 |
| | Si | 0.33 | 0.53 | 0.90 | 0.91 | 0.76 | 0.83 | 0.90 | 0.90 | 0.98 | 0.99 | 1.09 | 1.00 | 1.00 |
| Repulp | Al | 1.49 | 3.26 | 4.43 | 5.48 | 6.41 | 6.37 | 6.62 | 7.24 | 6.32 | 6.32 | 7.30 | 7.15 | 6.18 |
| PF + W | K | 53.6 | 84.6 | 77.2 | 75.0 | 77.3 | 77.7 | 78.6 | 74.6 | 72.3 | 77.2 | 76.0 | 77.0 | — |
| (Stream #3) | Na | 0.034 | 0.109 | 0.161 | 0.253 | 0.346 | 0.391 | 0.497 | 0.542 | 0.545 | 0.580 | 0.600 | 0.638 | 0.108 |
| | S | 19.8 | 26.5 | 27.0 | 27.0 | 25.9 | 25.9 | 25.2 | 25.2 | 24.6 | 25.2 | 25.5 | 24.8 | 23.8 |
| | Si | 0.03 | 0.01 | 0.05 | 0.11 | 0.01 | 0.06 | 0.01 | 0.05 | 0.05 | 0.08 | 0.12 | 0.12 | — |
| Barren | Al | 1.49 | 3.96 | 6.76 | 9.09 | 9.09 | 8.09 | 10.3 | 11.1 | 9.75 | 9.25 | 11.0 | 11.3 | 7.78 |
| $K_2SO_4$ | K | 16.9 | 18.3 | 20.3 | 25.0 | 27.7 | 28.7 | 36.0 | 31.1 | 36.8 | 32.4 | 33.3 | 45.1 | — |
| liquor | Na | 0.032 | 0.125 | 0.250 | 0.373 | 0.476 | 0.554 | 0.739 | 0.804 | 0.835 | 0.879 | 0.950 | 0.994 | 0.670 |
| (Stream #4) | S | 5.67 | 3.77 | 0.208 | 2.04 | 2.89 | 2.76 | 3.06 | 1.56 | 3.54 | 1.39 | 1.19 | 1.79 | — |
| | Si | 0.01 | 0.02 | 0.06 | 0.08 | 0.08 | 0.08 | 0.13 | 0.13 | 0.12 | 0.12 | 0.14 | 0.14 | — |
| | KOH | 2.8 | 9.8 | 23.2 | 26.3 | 30.8 | 28.6 | 39.2 | 39.2 | 37.5 | 39.2 | 38.1 | 38.9 | 25.8 |

TABLE 12

Analysis of Products, Wt %

| Cycle No. | | | 1 | 2 | 3 | 4 | 5 | 6 | 7 | 8 |
|---|---|---|---|---|---|---|---|---|---|---|
| Trihydrate | $SiO_2$ | | 0.032 | 0.026 | 0.026 | 0.032 | 0.19 | 0.37 | 0.214 | 0.041 |
| Stream #6 | $K_2O$ | | 0.46 | 2.12 | 1.92 | 0.46 | 0.30 | 0.40 | 0.30 | 0.47 |
| | $Na_2O$ | | 0.27 | 0.34 | 0.096 | 0.084 | 0.067 | 0.078 | 0.35 | 0.31 |
| | $SO_3$ | | 0.35 | 1.78 | 1.19 | 0.158 | 0.013 | 0.013 | 0.013 | <0.01 |
| | Ca | | — | — | <0.001 | — | — | <0.001 | — | — |
| | Mn | | — | — | 0.003 | — | — | <0.002 | — | — |
| | Fe | | — | — | 0.006 | — | — | 0.007 | — | — |
| | V | | — | — | <0.01 | — | — | 0.01 | — | — |
| | P | | — | — | <0.001 | — | — | 0.001 | — | — |
| | Ti | | — | — | <0.01 | — | — | <0.01 | — | — |
| $K_2SO_4$ | $SiO_2$ | | — | 0.14 | — | — | 0.02 | — | 0.019 | — |
| Stream #7 | $Al_2O_3$ | | 0.02 | 0.02 | 0.40 | 0.22 | 0.14 | 1.11 | 0.047 | 0.09 |
| | $Na_2O$ | | 0.004 | 0.001 | 0.008 | 0.008 | 0.01 | 0.013 | 0.009 | 0.011 |

| Cycle No. | | | 9 | 10 | 11 | 12 | 13 |
|---|---|---|---|---|---|---|---|
| Trihydrate | $SiO_2$ | | 0.17 | 0.27 | 0.41 | 0.32 | 1.13 |
| Stream #6 | $K_2O$ | | 0.37 | 0.45 | 0.52 | 1.05 | — |
| | $Na_2O$ | | 0.31 | 0.26 | 0.22 | 0.25 | — |
| | $SO_3$ | | <0.01 | <0.01 | <0.01 | <0.01 | — |
| | Ca | | — | — | — | 0.003 | — |
| | Mn | | <0.002 | — | — | <0.002 | — |
| | Fe | | 0.012 | — | — | 0.011 | — |
| | V | | <0.01 | — | — | <0.01 | — |
| | P | | 0.001 | — | — | 0.001 | — |
| | Ti | | <0.01 | — | — | <0.01 | — |
| $K_2SO_4$ | $SiO_2$ | | <0.08 | <0.02 | 0.43 | <0.02 | <0.02 |

TABLE 12-continued

| | Analysis of Products, Wt % | | | | | |
|---|---|---|---|---|---|---|
| Stream #7 | $Al_2O_3$ | 2.98 | 0.03 | 0.14 | 0.18 | 0.09 |
| | $Na_2O$ | 0.013 | 0.024 | 0.013 | 0.012 | 0.011 |

Stream 6 is $Al(OH)_3$.
Stream 7 is $K_2SO_4$.

EXAMPLE 9

From the impurities buildup recycle tests, Example 8, the cycles were each tested for Al, K, and S extraction. The overall aluminum recoveries corresponded to the single leach tests as shown in Example 8. The potassium recovery, as $K_2SO_4$, was much lower than expected, it is believed due to the depressed solubility of $K_2SO_4$ in the presence of KOH. Recovery of $K_2SO_4$ was improved with the addition of a second water repulp stage added in cycle 13. The sulfur extraction recovery corresponded to the single leach tests as shown in Example 2. The extraction results for the thirteen cycles are shown in Table 13.

TABLE 13

| Cycle No. | Extraction, % | | |
|---|---|---|---|
| | Al | K | S |
| 1 | 92.5 | 95.7 | 96.8 |
| 2 | 92.7 | 69.1 | 91.1 |
| 3 | 92.0 | 28.2 | 81.7 |
| 4 | 90.6 | 69.0 | 90.2 |
| 5 | 93.3 | 66.7 | 89.9 |
| 6 | 90.3 | 11.6 | 79.4 |
| 7 | 92.4 | 45.0 | 85.2 |
| 8 | 92.0 | 59.5 | 88.8 |
| 9 | 90.8 | 73.6 | 92.6 |
| 10 | 91.6 | 45.8 | 85.6 |
| 11 | 92.0 | 66.4 | 90.1 |
| 12 | 91.9 | 70.8 | 91.4 |
| 13 | 92.6 | 94.6 | 96.1 |
| Avg | 91.9 | 64.7 | 89.1 |

EXAMPLE 10

Tests were conducted of KOH regeneration utilizing 225 ml of a process $K_2SO_4$ solution which had previously been sulfidized and carbonated to contain 75.3% K, 0.4% $S^=$, 8.31% $SO_4^=$, 94.2% $HCO_3^-$ and 4.3% $CO_3^=$. The solution was boiled to convert $KHCO_3$ to $K_2CO_3$ and water by driving off $CO_2$. Solution volume was maintained by adding water. After boiling for 70 minutes, pH of the solution rose from 8.1 to 10.6. An 82% conversion was achieved.

| Conditions: | |
|---|---|
| $KHCO_3/(K_2CO_3)$ solution | 225 ml carbonated solution from II |
| Decarbonation | By boiling with mild agitation Solution volume maintained with $H_2O$. |
| Reaction in effect: | $2KHCO_3 \rightarrow K_2CO_3 + H_2O + CO_2$ |

The resulting $K_2CO_3/(KHCO_3)$ solution was then made caustic by reaction with $Ca(OH)_2$. The conditions and results are summarized in Table 14.

TABLE 14

| Conditions: | |
|---|---|
| $K_2CO_3/(KHCO_3)$ solution | 200 ml, decarbonated solution |
| $Ca(OH)_2$ | 13.6 g |
| Stoich Ca for $CO_3$ and $HCO_3$ | 1.10 |
| Temperature | 85–90° C. |
| Time | 30 min, volume maintained by $H_2O$ addition |
| Reactions in effect: | $K_2CO_3 + Ca(OH)_2$ → $2KOH + CaCO_3$ |
| | $KHCO_3 + Ca(OH)_2$ → $KOH + CaCO_3 + H_2O$ |

Results

| Product | Wt/Vol g or ml | Assay, g/l | | | | | pH | K Distr % | Conversion of $KHCO_3$ to $K_2CO_3$ % |
|---|---|---|---|---|---|---|---|---|---|
| | | K | Ca | $HCO_3^-$ | $CO_3^=$ | $OH^-$ | | | |
| $K_2CO_3/KHCO_3$ solution | 200 | (75.8) | — | 18.0 | 41.2 | 0.0 | 10.6 | 100.0 | |
| $Ca(OH)_2$ | 13.6 | | (54.1) | — | — | (45.9) | | 0.0 | |
| | | | | | | | | 100.0 | |
| Causticized solution[1] | 197 | — | | 0.0 | 10.8 | 21.8 | | | 78 |
| Residue | 18.2 | | | | | | | | |

[1]Soln sp gr = 1.10, % KOH = 71.9/1100 × 100 = 6.5% KOH.

EXAMPLE 11

Initial pyrometallurgical conversion of $K_2SO_4$ to $K_2CO_3/KOH$ was attempted in a tube furnace. The tube furnace consisted of a one-inch diameter quartz tube surrounded by an electrically heated furnace. The sample was placed in a silica "boat" inside the quartz tube with a 10–20 gram mass being typical. Reaction gases, introduced at one end, flowed over the sample and exhausted at the other. Temperature was monitored above the boat and at the tube exit.

Reagent grade $K_2SO_4$ was the starting material for all tests. Time, temperature, and reaction gas composition were monitored on each of the six tests conducted.

Of the six tests, Tests 3, 4, and 6 showed appreciable conversion to $K_2CO_3$ yielding final products assaying 38.5%, 98.6%, and 78.8% $K_2CO_3$, respectively. Very little reaction took place in Test 1 and Tests 2 and 5 completely volatilized.

Tests 3 and 4 used a reaction gas consisting of 66% CO, 33% $N_2$. Test 3 lasted 15 minutes and Test 4 lasted 30 minutes. Both were run at 900° C. The reaction gas for Test 6 was 66% $H_2$ and 33% $N_2$ at 850° C.

Table 15 summarizes these data.

TABLE 15

Tube Furnace Tests

| Test No. | Temp °C. | Time min | Reaction Gas, % | | | Results | |
|---|---|---|---|---|---|---|---|
| | | | CO | $H_2$ | $N_2$ | | |
| 1 | 850 | 60 | 66 | — | 33 | 16.3% Wt loss X-ray analysis: | 10% KOH Majority $K_2SO_4$ |
| 2 | 900 | 60 | 66 | — | 33 | Sample completely volatilized | |
| 3 | 900 | 15 | 66 | — | 33 | 12.4% wt loss Final product analysis: | 51.0% $K_2SO_4$ 38.5% $K_2CO_3$ |
| 4 | 900 | 30 | 66 | — | 33 | Small amount of sample recovered Final product analysis: | 1.02% $K_2SO_4$ 98.6% $K_2CO_3$ |
| 5 | 800 | 15 | 0 | 66 | 33 | Sample completely volatilized | |
| 6 | 850 | 15 | 0 | 66 | 33 | 39% wt loss Final product analysis: | 10.7% $K_2SO_4$ 78.8% $K_2CO_3$ |

EXAMPLE 12

Following the tube furnace test series, a series of five fluid-bed reactor tests were made to convert $K_2SO_4$ to $K_2CO_3$ based upon DTA-TGA data and thermodynamic computer models.

The reactor used was a 4-inch diameter electrically heated unit constructed of 316 stainless steel. A preheater for the reaction gases was added for Tests 3–5.

Test 1 was at 675° C. with a reaction gas consisting of 10% $H_2$, 20% $N_2$, 65% $CO_2$, 5% $H_2O$. The bed temperature was increased to 760° C. with the reactor walls at 850° C. A considerable amount of $H_2S$ was detected in the off-gas indicating the conversion was taking place. As the test continued, the bed temperature decreased even though the wall temperature was the same. At 4 hours, the reactor was shut down and the bed was observed to have fused to the walls of the reactor thereby causing the temperature decrease. Total conversion was 45.9%.

Test 3 used the same reaction gas as in Test 2. The starting bed was 100% $K_2SO_4$. A preheater to heat the reaction gases was in place in an attempt to lower the temperature differential between the walls and bed. The bed temperature at equilibrium was 720° C. with the walls at 750° C. and the reaction gases at 507° C. The test lasted three hours as a pressure buildup from the bed caking was detected. Some fusion to the reactor walls was present. Total conversion for the bed material was very low (1.1% $K_2CO_3$) but the material fused to the walls had 19.8% $K_2CO_3$. This indicates that the higher temperature of the walls, 750° C., helped the reaction. In actual practice, a high bed temperature (760° C.–800° C.) would be necessary to give higher conversions.

In Test 4 a 100% $K_2CO_3$ bed was used because (1) it should allow higher temperatures (780° C.–800° C.) before any major fusion problems became apparent, and (2) it would simulate more closely an actual bed. With a carbonate bed it would, hopefully, tend to agglomerate to the carbonate provided unreacted sulfate did not build up.

The reaction gases for Test 4 were 25% $H_2$, 20% $N_2$, 50% $CO_2$, and 5% $H_2O$. The equilibrium wall temperature was 860° C., bed temperature was 780° C. and reaction gas was at 680° C. A feeder was in place to slowly feed $K_2SO_4$ to the bed. A target rate was 3 grams/minute.

Test 4 was quite successful in the conversion of the $K_2SO_4$ to $K_2CO_3$ with 86.1% being converted. Problems with the feeder allowed only 140 g of K to be added over a 270-minute period and the 86.1% conversion was only on this small amount.

Test 5 was an attempt to repeat the Run 4 work with the feeder problems corrected. Unfortunately, a large amount of unreacted sulfate, allowed to build up in the bed, fused as the reaction took place. Total conversion was 80.3% ($K_2SO_4 \rightarrow K_2CO_3$).

Table 16 summarizes the fluid-bed reactor tests.

TABLE 16

Fluid bed Reactor - Conversion of $K_2SO_4$ to $K_2CO_3$

| Test No. | Equilibrium Temp, °C. | | Pre-heated Gas, °C. | Gas Composition | | | | | | | | | Sample | Assay, % | | % Conversion | |
|---|---|---|---|---|---|---|---|---|---|---|---|---|---|---|---|---|---|
| | Bed | Wall | | Feed % | | | | Off-gas, % (Equilibrium) | | | | | | $K_2SO_4$ | $K_2CO_3$ | $SO_4$ | $CO_3$ |
| | | | | $H_2$ | $N_2$ | $CO_2$ | $H_2O$ | $H_2$ | $N_2$ | $CO_2$ | CO | $H_2S$ | | | | | |
| 1 | 675 | 746 | Not used | 10 | 20 | 65 | 5 | 8.1 | 21.0 | 61.2 | 0.0 | 8 ppm | Initial Bed | 100 | 0.0 | 0 | |
| | | | | | | | | | | | | | 4 hr Bed | 100 | 0.1 | 0 | |
| 2 | 760 | 850 | Not Used | 20 | 20 | 55 | 5 | 9.6 | 24.9 | 53.2 | 2.5 | 0.37% | Initial Bed | 100 | 0.0 | | |
| | | | | | | Fused reactor | | | | | | | 15 min Bed | 99.5 | 0.184 | | |
| | | | | | | | | | | | | | 30 min Bed | 99.9 | 0.53 | | |
| | | | | | | | | | | | | | 60 min Bed | 98.7 | 0.88 | | |
| | | | | | | | | | | | | | 120 min Bed | 99.9 | 0.51 | | |
| | | | | | | | | | | | | | 180 min Bed | 99.6 | 0.46 | | |
| | | | | | | | | | | | | | 240 min | — | 45.4 | | |
| | | | | | | | | | | | | | Final Bed | 49.0 | 41.5 | 45.9 | |
| | | | | | | | | | | | | | Final Wall | | | | |
| 3 | 718 | 750 | 507 | 20 | 20 | 55 | 5 | 12.0 | 24.9 | 56.0 | 3.4 | 0.38% | Initial Bed | 100 | 0 | | |
| | | | | | | | | | | | | | 15 min Bed | | 0.01 | | |
| | | | | | | | | | | | | | 30 min Bed | 99.9 | 0.01 | | |
| | | | | | | | | | | | | | 60 min Bed | 99.9 | 0.01 | | |
| | | | | | | | | | | | | | 120 min Bed | 98.9 | 0.35 | | |
| | | | | | | | | | | | | | 180 min Bed | 98.5 | 1.1 | | |

TABLE 16-continued

Fluid bed Reactor - Conversion of $K_2SO_4$ to $K_2CO_3$

| Test No. | Equilibrium Temp, °C. Bed | Equilibrium Temp, °C. Wall | Pre-heated Gas, °C. | Feed % $H_2$ | Feed % $N_2$ | Feed % $CO_2$ | Feed % $H_2O$ | Off-gas, % (Equilibrium) $H_2$ | Off-gas, % (Equilibrium) $N_2$ | Off-gas, % (Equilibrium) $CO_2$ | Off-gas, % (Equilibrium) $CO$ | Off-gas, % (Equilibrium) $H_2S$ | Sample | Assay, % $K_2SO_4$ | Assay, % $K_2CO_3$ | % Conversion $SO_4$ | % Conversion $CO_3$ |
|---|---|---|---|---|---|---|---|---|---|---|---|---|---|---|---|---|---|
| | | | | | | | | | | | | | 180 min Final Wall | (80.2)[1] | 19.8 | (19.8)[1] | |
| 4 | 780 | 860 | 680 | 25 | 20 | 50 | 5 | 12.6 | 23.7 | 44.6 | 12.8 | 320 ppm | Initial Bed | 1.46 | 100 | | |
| | | | | Run 4 had a continuous feed | | | | | | | | | 30 min Bed | 3.34 | 98.5 | 23.1 | |
| | | | | of $K_2SO_4$ to a $K_2CO_3$ bed | | | | | | | | | 60 min Bed | 5.20 | 91.0 | 27.4 | |
| | | | | | | | | | | | | | 120 min Bed | 5.28 | 91.7 | — | |
| | | | | | | | | | | | | | 150 min Bed | 13.3 | 86.7 | — | |
| | | | | | | | | | | | | | 180 min Bed | 3.82 | 96.1 | — | |
| | | | | | | | | | | | | | 210 min Bed | 6.81 | 90.3 | — | |
| | | | | | | | | | | | | | 270 min Bed | 2.30 | 92.8 | 86.1 | |
| 5 | 740 | 830 | 680 | 25 | 20 | 50 | 5 | 6.8 | 24.5 | 47.7 | 22.2 | 1140 ppm | Initial Bed | 1.66 | 95.0 | | |
| | | | | | | | | | | | | | 15 min Bed | 3.51 | 91.2 | 0 | |
| | | | | | | | | | | | | | 60 min Bed | 14.8 | 81.1 | 0 | |
| | | | | | | | | | | | | | 90 min Bed | 20.3 | 77.6 | 0 | |
| | | | | | | | | | | | | | 120 min Bed | 20.5 | 75.3 | 0 | |
| | | | | | | | | | | | | | 150 min Bed | 20.3 | 76.6 | 0 | |
| | | | | | | | | | | | | | 180 min Bed | 15.9 | 81.8 | 0 | |
| | | | | | | | | | | | | | 210 min Bed | 8.01 | 86.8 | 14.8 | |
| | | | | | | | | | | | | | 240 min Bed | 4.59 | 91.0 | 61.9 | |
| | | | | | | | | | | | | | 260 min Final Bed | 4.74 | 91.8 | 80.3 | |

[1]Estimate based on the $K_2CO_3$ assay.

EXAMPLE 13

A test was undertaken to verify the following reaction for the conversion of $K_2CO_3$ to KOH:

$$K_2CO_3 + Ca(OH)_2 \rightarrow 2KOH + CaCO_3.$$

This test was initially run at ambient temperature with no detectable reaction after 30 minutes. It was then heated to boiling (100° C.) for 60 minutes with 99.5% conversion. Table 17 describes the conditions and results of this rest.

TABLE 17

Conversion of Potassium Carbonate
to Potassium Hydroxide
Test Description and Results Reaction: $K_2CO_3 + Ca(OH)_2 \rightarrow 2KOH + CaCO_3$ (insoluble)
Conditions: $K_2CO_3$, g 138.2
$Ca(OH)_2$, g 74.7 (1 × stoichiometric)
$H_2O$, ml 1000
Temp 30 min at ambient
60 min at 97° C. (boiling)

A 30-minute sample was taken and the pH was 11.0. This was too low to have a significant concentration of $OH^-$ present. The solution was taken to boiling for 60 minutes with a much higher pH noted (13+). The slurry was filtered and the cake washed with water.

| Sample | Amount g or ml | Analysis, % or g/l OH | Analysis, % or g/l $CO_3$ | Analysis, % or g/l K | Analysis, % or g/l Ca | % Conversion $K_2CO_3 \rightarrow$ 2KOH |
|---|---|---|---|---|---|---|
| Filtrate[1] | 848 | 34.9 | 8.40 | 88.1 | (2.10)[3] | |
| Precipitate | 100.3 | 0.0 | 1.62[2] | 0.366 | 38.5 | 99.5[4] |
| | | | | | (96.0) balance, % | |

[1]The amount of filtrate contained in the wash was calculated from the wash liquor analysis and this value added to the filtrate volume.
[2]A major portion of the precipitate was found by analysis to be $HCO_3^-$.
[3]Calculated value.
[4]Based on $K_2CO_3$ added and $K_2CO_3$ in the residue.

EXAMPLE 14

A test was performed to evaluate the conversion of potassium sulfate, $K_2SO_4$, to potassium formate, KCOOH, with the subsequent conversion of the KCOOH product to potassium carbonate, $K_2CO_3$.

The conversion of $K_2SO_4$ to KCOOH was carried out in an autoclave. The feed liquor comprised a 1200 cc solution comprising 120 grams/liter $K_2SO_4$. The solution was contacted with 72 grams of $Ca(OH)_2$, approximately 1.5 times the stoichiometric amount. A large amount of CO excess was added at a flow rate equalling 4 liters per minute. The natural pressure of the autoclave was approximately 220 psi, with CO added to increase the pressure to approximately 500 psi. The temperature of the test was conducted at 220° C. The test ran for 15 minutes at the specified temperature and pressure. An 88.2 percent conversion of $K_2SO_4$ to KCOOH occurred. Table 18 summarizes the results of the test.

In the second part of the testing, for the conversion of KCOOH to $K_2CO_3$, the reaction was carried out in a furnace with atmospheric oxygen as the only oxidizing agent. Potassium formate crystals from the initial testing were produced by evaporation of the liquor. These formate crystals were then tested for the evaluation of the conversion of potassium formate to potassium carbonate. At 200° C., the crystals melted, however, no reaction was noted over a 2-hour period (the melting point of KCOOH is approximately 170° C.). The temperature was then increased to 400° C. Crystals were produced at this temperature. These crystals were assayed at 77 percent $K_2CO_3$.

TABLE 18

| Sample | Amount g or ml | Assay, % or g/l K | Assay, % or g/l Ca | Assay, % or g/l $SO_4$ | % Conversion $K_2SO_4 \rightarrow$ $KHCO_2$ |
|---|---|---|---|---|---|
| Feed liquor | 1200 | (64.6) | (sat'd) | (79.4) | |
| Filtrate | 994 | 62.3 | 0.87 | 13.8 | 88.2[2] |
| Precipitate[1] | 119.4 | 6.42 | 26.4 | 56.7 | |

[1]21.1% cake moisture - filter rate 52 gallons/hr ft[2].
[2]Based on sulfate assays.

EXAMPLE 15

Testing was done to evaluate a direct, one-step hydrometallurgical conversion of $K_2SO_4$ to KOH. The first reaction involved contacting potassium sulfate with hydrated lime under an atmosphere of carbon monoxide to produce potassium formate and gypsum. This reaction took place at 500 psi and 225° C. The system was allowed to react for 30 minutes with a CO sparge of 4 liters per minute. The next reaction involved oxidizing the potassium formate produced in the first reaction with oxygen at 500 psi and 225° C. to yield potassium carbonate. The formed potassium carbonate immediately reacted with excess hydrated lime to produce potassium hydroxide.

The potassium sulfate and calcium hydroxide were added as a 25 percent solids, by weight, slurry to a pressure autoclave. The autoclave was heated to 225° C., then a CO atmosphere was sparged through the system at 500 psi for 30 minutes. Oxygen was then sparged through the unit for 30 minutes under the same conditions. The results are shown in Table 19.

TABLE 19

| Sample | Assay, % or g/l | | | | % Conversion |
|---|---|---|---|---|---|
| | K | $SO_4$ | $CO_3$ | Ca | |
| Filtrate | 80 | 2.70 | 1.10 | 25.7 | $K_2SO_4 \to KHCO_2$: 97.4% |
| Precip. | 0.138 | 57.6 | 2.0 | 28.7 | $KHCO_2 \to K_2CO_3$: 22.1% |
| Balance, % | (K) 94.7 | | | | $K_2SO_4 \to KOH$: 21.5% |

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A process for recovering aluminum and potassium values from alunite ore comprising:
   (a) contacting said ore at a temperature above 60° C. with potassium hydroxide saturated with potassium sulfate to which no Na has been added to form a potassium sulfate-saturated primary potassium hydroxide leach liquor containing said Al values and a primary leach residue containing said K values;
   (b) separating said primary leach liquor from said primary leach residue;
   (c) precipitating $Al(OH)_3$ crystals from the liquor of step (b) to recover the Al values therefrom; and
   (d) aqueous leaching said primary leach residue of step (b) to form a secondary leachate containing said K values.

2. A process according to claim 1 further comprising desilicating the liquor of step (b) prior to precipitating said $Al(OH)_3$.

3. A process according to claim 2 wherein said desilication is by contacting said primary leach liquor with CaO at a temperature of from about 180° to about 200° C. and for a retention time of from about 5 to about 30 minutes.

4. A process according to claim 3 wherein said CaO is in an aqueous solution as $Ca(OH)_2$ in an amount of from about 12 to about 20 grams per liter of said first leachate.

5. A process according to claim 1 further comprising calcining said $Al(OH)_3$ crystals to produce alumina.

6. A process according to claim 1 further comprising crystallizing $K_2SO_4$ from at least a portion of said secondary leach to form a spent liquor.

7. A process according to claim 1 further comprising:
   (e) regenerating KOH for recycle to step (a) from at least a portion of said secondary leachate of step (d).

8. A process according to claim 7 wherein step (e) comprises contacting a portion of said secondary leachate of step (d) with lime and hydrogen sulfide to form calcium sulfate and a potassium sulfide- and potassium hydrogen sulfide-containing liquor; carbonating said liquor to form potassium carbonate; and causticizing said potassium carbonates to produce potassium hydroxide.

9. A process for recovery of alumina and potassium sulfate from alunite ore containing Al, K and S values, comprising:
   (a) contacting said ore at a temperature above 60° C. with potassium hydroxide saturated with potassium sulfate to which no sodium has been added to form a potassium sulfate-saturated primary potassium hydroxide leach liquor containing said Al values and a primary leach residue containing said K and S values;
   (b) separating said primary leach liquor from said primary leach residue;
   (c) precipitating $Al(OH)_3$ crystals from the liquor of step (b) to recover Al values therefrom;
   (d) calcining said $Al(OH)_3$ crystals to produce alumina;
   (e) aqueous leaching said primary leach residue of step (b) to form a secondary leachate containing said K and S values; and
   (f) crystallizing $K_2SO_4$ from at least a portion of said secondary leachate to form a spent liquor.

10. A process according to claim 9 further comprising desilicating the liquor of step (b) prior to step (c).

11. A process according to claim 10 further comprising regenerating KOH for recycle to step (a) from at least a portion of said secondary leachate of step (e).

12. A process according to claim 11 wherein said regenerating comprises contacting a portion of said secondary leachate of step (e) with lime and hydrogen sulfide to form calcium sulfate and a potassium sulfide- and potassium hydrogen sulfide-containing liquor; carbonating said liquor to form potassium carbonate; and causticizing said potassium carbonates to produce potassium hydroxide.

13. A process according to claim 9 further comprising recycling at least a portion of the spent liquor of step (f) to step (e); and controlling the level of KOH in said second leach liquor of step (f) by recycling at least a portion of the spent liquor to step (a).

14. A process according to claim 13 further comprising controlling the build-up of impurities during step (d) by removing said impurities from at least a portion of said desilicated leach liquor.

15. A method of producing $Al_2O_3$ and $K_2SO_4$ from alunite ore using CaO as the only make-up reagent comprising:
   (a) contacting said ore at a temperature above 60° C. with a $K_2SO_4$-saturated KOH to which no Na has been added to form a $K_2SO_4$-saturated first KOH leach liquor containing said Al values and a first leach residue containing said K and S values;

(b) separating said first leach liquor from said first leach residue;

(c) desilicating said separated first leach liquor and separating the precipitated silicates from said liquor;

(d) precipitating Al(OH)$_3$ crystals from the desilicated liquor of step (c) to recover the Al values therefrom;

(e) calcining said Al(OH)$_3$ crystals to produce alumina;

(f) leaching of said first leach residue of step (b) with an aqueous solution to form a second leach liquor containing said K and S values;

(g) crystallizing K$_2$SO$_4$ from at least a portion of said second leach liquor to form a spent liquid;

(h) regenerating KOH for recycle to step (a) by contacting a portion of said secondary leachate of step (f) with lime and hydrogen sulfide to form calcium sulfate and a potassium sulfide- and potassium hydrogen sulfide-containing liquor; carbonating said liquor to form potassium carbonate; and causticizing said potassium carbonates to produce potassium hydroxide;

(i) recycling at least a portion of the spent liquor of step (g) to step (f);

(j) controlling the level of KOH in said second leach liquor of step (g) by recycling to step (a) at least one of the streams selected from the group consisting of (1) at least a portion of the spent liquor of step (g); and (2) at least a portion of said second leach liquor of step (f);

(k) controlling the build-up of impurities in the crystallization of step (d) by removing said impurities from at least a portion of said desilicated liquor;

(l) heating said CaCO$_3$ of step (h) to form CaO and CO$_2$; and (m) recycling said CaO to step (c) and step (h).

16. In a process for recovering aluminum values and potassium sulfate from alunite ore containing aluminum, sulfur and potassium values wherein the ore is treated with a caustic leach to solubilize aluminum values into the leachate, the improvement comprising:

(a) leaching with potassium sulfate-saturated potassium hydroxide to which no sodium has been added to form an aluminum-containing primary leachate and a primary residue containing said potassium and sulfur values;

(b) separating said leachate from said residue;

(c) solubilizing said potassium and sulfur values in said residue to form a potassium sulfate solution and recovering potassium sulfate therefrom; and (d) recovering aluminum from said leachate.

17. The improvement according to claim 16 in which the ore further contains silicon values, the process further comprising desilicating said leachate.

18. The improvement according to claim 17 in which said desilicating comprises contacting said leachate with lime; recovering aluminum from said solution as aluminum hydroxide crystals; and calcining said crystals to produce alumina.

19. The improvement according to claim 16 in which potassium hydroxide is generated for recycle to step (a), the improvement further comprising:

(i) treating a portion of said potassium sulfate solution of step (c) with lime and hydrogen sulfide to form calcium sulfate, potassium sulfide, potassium hydrogen sulfide and water;

(ii) treating the sulfide products of step (i) with water and carbon dioxide to form potassium carbonate, potassium bicarbonate and hydrogen sulfide;

(iii) heating the potassium bicarbonate of step (ii) in the presence of water to form potassium carbonates and carbon dioxide;

(iv) treating said potassium carbonates with lime to generate potassium hydroxide, carbon dioxide and calcium carbonate, and separating said potassium hydroxide.

20. The process of claim 19 in which hydrogen sulfide from step (ii) is recycled to step (i).

21. The process of claim 19 in which carbon dioxide from step (iii) is recycled to step (ii).

22. The process of claim 19 in which carbon dioxide from step (iv) is recycled to step (ii).

23. The process of claim 19 in which calcium carbonate from step (iv) is decomposed to lime and carbon dioxide.

24. The process of claim 19, in which formed lime is recycled to step (i).

25. The process of claim 23 in which formed carbon dioxide is recycled to step (i).

26. The improvement according to claim 16 in which said potassium hydroxide is generated for recycle to step (a), the improvement further comprising:

(i) treating a portion of said potassium sulfate solution of step (c) with lime and carbon monoxide under pressure to form potassium formate in solution and a calcium sulfate precipitate;

(ii) performing a liquid/solid separation of the products of step (i);

(iii) crystallizing potassium formate from the liquid of step (ii) and separating the crystals from the mother liquor;

(iv) oxidizing the crystals of step (iii) to potassium carbonate;

(v) treating potassium carbonate of step (iv) with lime to generate potassium hydroxide, carbon dioxide and calcium carbonate, and separating said potassium hydroxide.

27. The improvement according to claim 16 in which said potassium hydroxide is generated for recycle to step (a), the improvement further comprising treating a portion of said potassium sulfate of step (c) with lime and carbon monoxide at elevated temperatures and pressures sufficient to form potassium formate and calcium sulfate; adding an oxidizing agent to convert at least a portion of the potassium formate to the carbonate, and form carbon dioxide and water; reacting the formed carbonate to react with lime to produce potassium hydroxide and calcium carbonate, and separating said hydroxide.

28. The process of claim 27, in which said added oxidizing agent is oxygen.

29. The process of claim 27, in which lime is added for treatment of said potassium sulfate solution in an amount in excess of that needed to react with all the potassium sulfate present, and no lime is added in conjunction with said oxidizing agent.

30. The improvement according to claim 16 in which said potassium hydroxide is generated for recycle to step (a), the improvement further comprising contacting a portion of said potassium sulfate solution of step (c) with a reducing agent at elevated temperature and for a time sufficient to produce potassium carbonate and hydrogen sulfide and contacting said potassium carbonate with an aqueous Ca(OH)$_2$ solution to produce a KOH solution and a CaCO₃ precipitate and separating the KOH solution for recycle to step (a).

31. The process according to claim 30, in which said contacting occurs at temperatures of from about 600° C. to about 1000° C. and in the presence of H₂O.

32. The process of claim 30 in which the reducing agent comprises coal.

33. The process of claim 30 in which the reducing agent comprises a mixture of hydrogen gas and carbon dioxide.

34. The process of claim 30 in which the reducing agent comprises carbon monoxide.

35. The improvement according to claim 16 in which said potassium hydroxide is generated for recycle to step (a), the improvement further comprising treating a portion of said potassium sulfate solution of step (c) with barium oxide to form potassium hydroxide and barium sulfate; and separating said potassium hydroxide.

36. The process of claim 35 in which barium oxide is regenerated from barium sulfate and recycled to form additional potassium hydroxide.

37. The process of claim 36 in which said regeneration comprises the steps of reducing said barium sulfate with coal to barium sulfide; reacting said barium sulfide with carbon dioxide to form barium carbonate and hydrogen sulfide; and reducing said barium carbonate to barium oxide.

* * * * *